United States Patent
Sakai et al.

(10) Patent No.: US 10,488,680 B2
(45) Date of Patent: Nov. 26, 2019

(54) OPTICAL MODULE

(71) Applicant: HAMAMATSU PHOTONICS K.K., Hamamatsu-shi, Shizuoka (JP)

(72) Inventors: Hiroto Sakai, Hamamatsu (JP); Yasushi Ohbayashi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 12 days.

(21) Appl. No.: 15/456,760

(22) Filed: Mar. 13, 2017

(65) Prior Publication Data

US 2017/0269387 A1    Sep. 21, 2017

(30) Foreign Application Priority Data

Mar. 16, 2016    (JP) .................. 2016-052617

(51) Int. Cl.
| | | |
|---|---|---|
| G02B 26/08 | (2006.01) | |
| G02F 1/29 | (2006.01) | |
| G02B 26/00 | (2006.01) | |
| G02F 1/01 | (2006.01) | |
| G02F 1/09 | (2006.01) | |

(Continued)

(52) U.S. Cl.
CPC ......... *G02F 1/0102* (2013.01); *G02B 27/283* (2013.01); *G02F 1/0121* (2013.01); *G02F 1/0136* (2013.01); *G02F 1/09* (2013.01); *G02F 1/25* (2013.01); *G02F 1/29* (2013.01); *G02B 7/18* (2013.01); *G02B 26/0883* (2013.01)

(58) Field of Classification Search
CPC .... G02B 27/286; G02B 5/30; G02B 27/0172; G02B 27/283; G02B 5/3083; G02B 2027/0125; G02B 27/0081; G02B 27/0101; G02B 27/14; G02B 5/04; G02B 6/00; G02B 6/32; G02B 6/2766; G02B 6/2773; G02B 27/145; G02B 3/0056; G02B 5/201; G02B 6/272

USPC ....... 359/301, 303, 237, 242, 290–292, 298, 359/304

See application file for complete search history.

(56) References Cited

U.S. PATENT DOCUMENTS

2003/0086265 A1* 5/2003 Ilsaka ................. F21V 11/18
                                                                362/268
2005/0041289 A1    2/2005 Berman
(Continued)

FOREIGN PATENT DOCUMENTS

| CN | 102621791 A | 8/2012 |
|---|---|---|
| JP | H7-029512 | 6/1995 |

(Continued)

*Primary Examiner* — Brandi N Thomas
(74) *Attorney, Agent, or Firm* — Drinker Biddle & Reath LLP

(57) ABSTRACT

An optical module includes: first and second optical elements; third and fourth optical elements; a first polarization control element and a first reflective light modulator that are sequentially arranged in one of a positive direction of a first vector and a negative direction of a second vector from the second optical element; a second polarization control element and a second reflective light modulator that are sequentially arranged in one of a negative direction of the first vector and a positive direction of the second vector from the third optical element; and a sliding mechanism that relatively moves the first and second optical elements and the third and fourth optical elements in the direction of the first vector relative.

9 Claims, 35 Drawing Sheets

(51) Int. Cl.
    *G02F 1/25*      (2006.01)
    *G02B 27/28*    (2006.01)
    *G02B 7/18*      (2006.01)

(56) References Cited

U.S. PATENT DOCUMENTS

| | | | |
|---|---|---|---|
| 2009/0103053 A1* | 4/2009 | Ichikawa | H04N 5/7458 353/33 |
| 2010/0277796 A1* | 11/2010 | Magarill | G02B 27/102 359/485.02 |
| 2014/0169840 A1* | 6/2014 | Yokoyama | G03G 15/0136 399/298 |
| 2016/0048069 A1 | 2/2016 | Inoue | |
| 2016/0054576 A1 | 2/2016 | Inoue et al. | |
| 2016/0062128 A1 | 3/2016 | Inoue et al. | |

FOREIGN PATENT DOCUMENTS

| | | |
|---|---|---|
| JP | 2000-227578 A | 8/2000 |
| JP | 2005-010724 A | 1/2005 |
| JP | 2010-054653 A | 3/2010 |
| JP | 2012-047632 A | 3/2012 |
| JP | 2014-202956 A | 10/2014 |
| JP | 2015-087729 A | 5/2015 |
| JP | 2015-132657 A | 7/2015 |

* cited by examiner

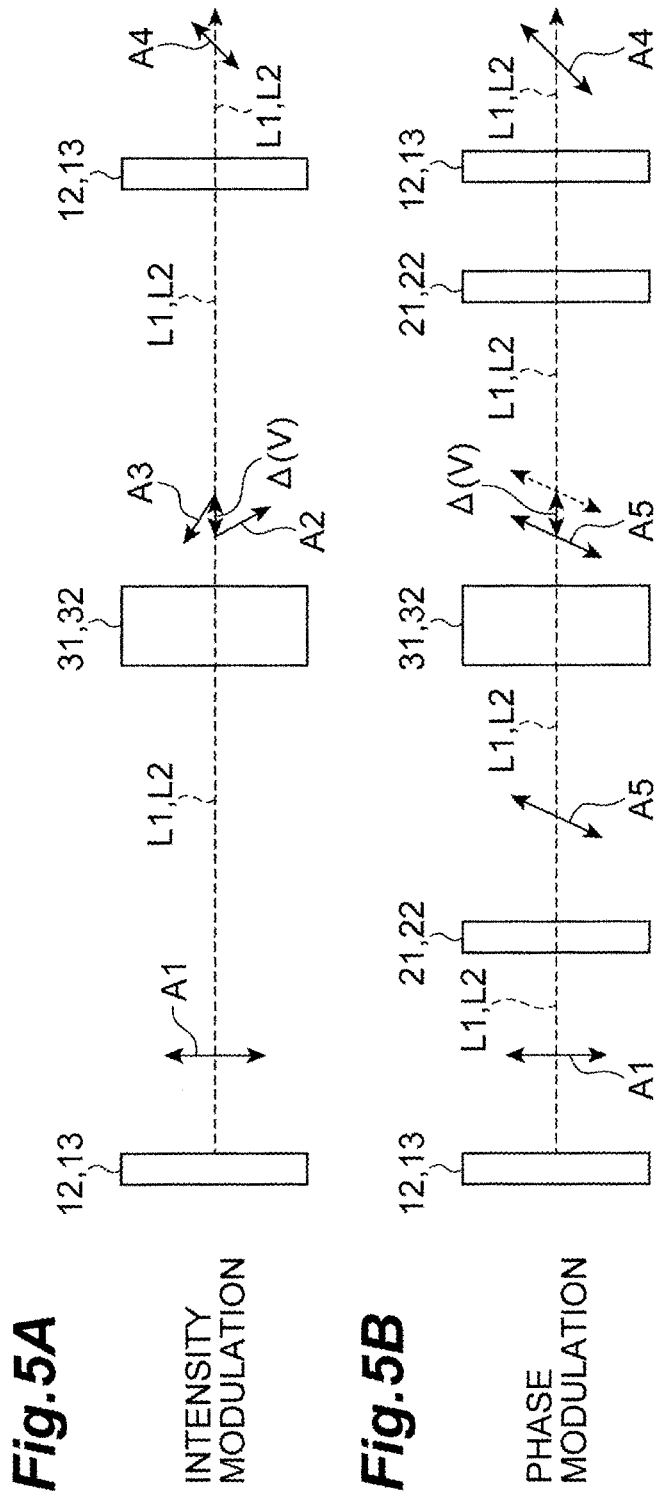

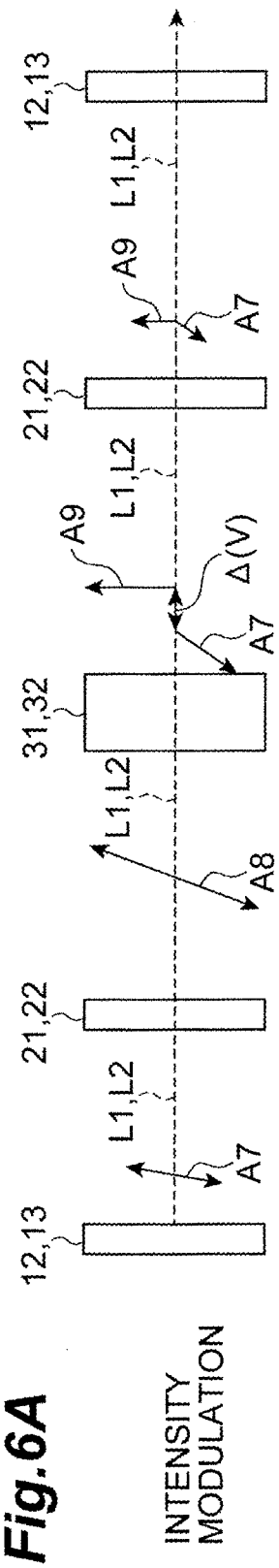
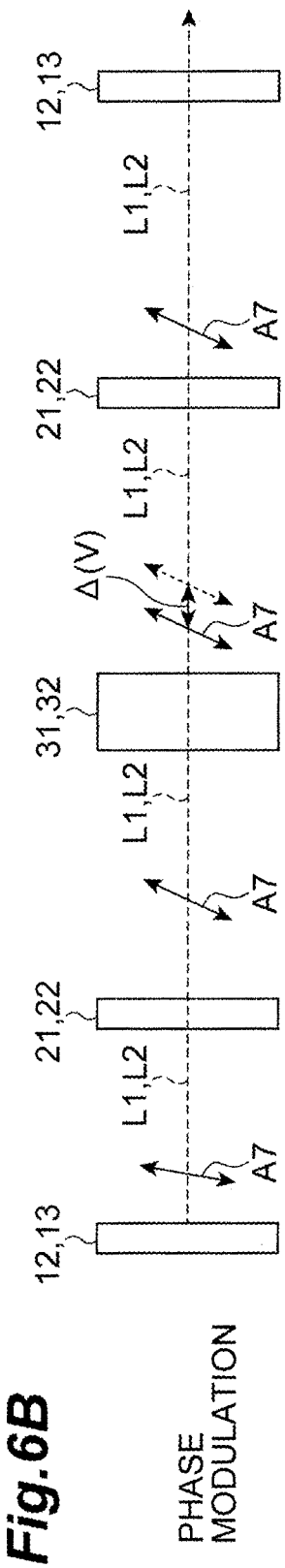
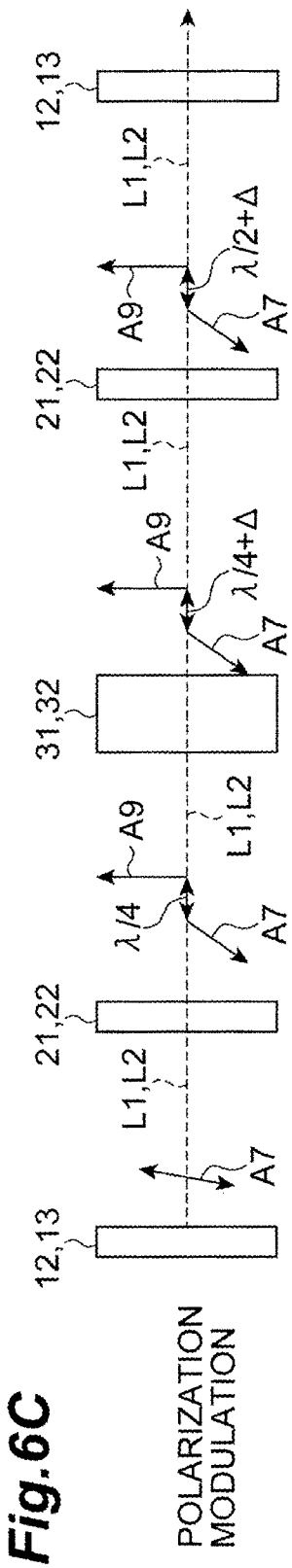

Fig.7

| | POLARIZATION ELEMENT ||| MODULATOR ||| INTENSITY |
| | POLARIZING PLATE | 1/4λ PLATE | FARADAY ROTATOR | UNIAXIAL | ISOTROPIC | |
|---|---|---|---|---|---|---|
| INTENSITY MODULATION | NULL | NULL | NULL | 45 | NULL | In |
| | 45 | NULL | NULL | 45 | NULL | 1/2 |
| PHASE MODULATION | NULL | NULL | Y | 0 | NULL | 1 |
| | NULL | 45 | NULL | NULL | Y | 1 |

*Fig.8*

| | POLARIZATION ELEMENT | | MODULATOR | | INTENSITY |
|---|---|---|---|---|---|
| | POLARIZING PLATE | 1/4λ PLATE | UNIAXIAL | ISOTROPIC | |
| INTENSITY MODULATION | 45+X | NULL | X | NULL | (1/4)In |
| PHASE MODULATION | X | NULL | X | NULL | 1/4 |
| | NULL | 45 | NULL | X | 1/4 |
| POLARIZATION MODULATION | NULL | 45+X | X | NULL | 1/4 |

*Fig.9A*

| TYPE 1 | | MODULATOR 31 | | |
|---|---|---|---|---|
| | | In | Ph | Pl |
| MODULATOR 32 | In | A | A | B |
| | Ph | A | A | B |
| | Pl | B | B | B |

*Fig.9B*

| TYPE 2 | | MODULATOR 31 | | |
|---|---|---|---|---|
| | | In | Ph | Pl |
| MODULATOR 32 | In | A | A | B |
| | Ph | C | A | B |
| | Pl | C | C | C |

*Fig.9C*

| TYPE 3 | | MODULATOR 31,32 | | |
|---|---|---|---|---|
| | | In | Ph | Pl |
| | | A | A | B |
| | | | | |
| | | | | |

OPTICAL MODULE

TECHNICAL FIELD

An aspect of the present invention relates to an optical module.

BACKGROUND

Japanese Unexamined Patent Publication No. 2015-87729 discloses a technique related to a wavelength conversion laser device. The wavelength conversion laser device includes a light source that emits a beam including a plurality of wavelength components, a demultiplexer that demultiplexes the beam into wavelength components, an light modulator that modulates the demultiplexed wavelength components, and a multiplexer that multiplexes the modulated wavelength components.

Japanese Unexamined Patent Publication No. 2012-47632 discloses a technique relating to a nonlinear microscope. The nonlinear microscope includes a light source, a dichroic mirror, and two spatial light phase modulators. The light source generates a laser beam for generating light of a specific wavelength from a specific type of molecules in an observation object through a nonlinear optical process. The dichroic mirror splits the laser beam into two wavelength components. Each spatial light phase modulator modulates the wavelength components. The wavelength components are multiplexed again after the modulation and are applied to the observation object through a light condenser.

SUMMARY

Recently, in order to realize various types of irradiation light in a light irradiation device, techniques of modulating an intensity distribution or a phase distribution of irradiation light using an light modulator have been researched. In such techniques, it is possible to further diversify the types of irradiation light, for example, by combining various optical elements such as a wavelength selecting filter or a polarization splitting element and a plurality of light modulators.

However, in order to realize such an optical system, it is necessary to carry out operations of appropriately selecting optical elements depending on a desired modulation mode and designing a necessary optical path to precisely arrange the optical elements and the light modulators. Such operations require skill, which is a burden on an operator. When it is intended to change a modulation mode, it is necessary to design an optical path again and to arrange the optical elements and the light modulators again, which is also a great burden.

An aspect of the present invention is made in consideration of the above-mentioned circumstances and an object thereof is to provide an optical module that can simply realize various modulation modes.

In order to achieve the above-mentioned object, an optical module according to an aspect of the present invention is an optical module for modulating and outputting input light, the optical module including: first and second optical elements sequentially arranged in a positive direction of a first vector; third and fourth optical elements located in a positive direction of a second vector intersecting the first vector relative to the first and second optical elements and sequentially arranged in the positive direction of the first vector; a first polarization control element and a first reflective light modulator sequentially arranged in one of the positive direction of the first vector and a negative direction of the second vector from the second optical element; a second polarization control element and a second reflective light modulator that are sequentially arranged in one of a negative direction of the first vector and the positive direction of the second vector from the third optical element; and a sliding mechanism configured to relatively move the first and second optical elements and the third and fourth optical elements to move in the direction of the first vector. The first optical element has a first wavelength selection surface that transmits a first beam and reflects a second beam having a wavelength other than that of the first beam. The first wavelength selection surface is disposed at an angle at which the second beam incident in the positive direction of one of the first vector and the second vector is reflected in the positive direction of the other of the first vector and the second vector. The second optical element is configured to output at least a part of a beam incident in the positive direction of the first vector to the first polarization control element and output at least a part of a beam returned from the first reflective light modulator via the first polarization control element in the positive direction of the second vector. The third optical element is configured to output at least a part of a beam incident in the positive direction of the second vector to the second polarization control element and output at least a part of a beam returned from the second reflective light modulator via the second polarization control element in the positive direction of the first vector. The fourth optical element has a second wavelength selection surface that reflects one of the first beam and the second beam and transmits the other of the first beam and the second beam. The second wavelength selection surface is disposed at an angle at which the one beam incident in the positive direction of one of the first vector and the second vector is reflected in the positive direction of the other of the first vector and the second vector.

According to the optical module, a desired type among several types of optical paths can be easily selected by changing a relative positional relationship between the first and second optical elements and the third and fourth optical elements using the sliding mechanism. Accordingly, as will be described later in embodiments, it is possible to simply realize various modulation modes.

In the optical module, at least one of the first and second wavelength selection surfaces may comprise a wavelength selecting filter or a dichroic mirror. Accordingly, it is possible to properly realize the first wavelength selection surface that reflects the first beam and transmits the second beam and/or the second wavelength selection surface that reflects one beam of the first beam and the second beam and transmits the other beam.

In the optical module, at least one of the second and third optical elements may comprise a polarization beam splitter or a half mirror. Accordingly, it is possible to realize an optical element that transmits at least a part of input light to the polarization control element and reflects at least a part of light returned from the reflective light modulator via the polarization control element.

The optical module may further include at least one of: a first shading portion disposed in the other direction of the positive direction of the first vector and the negative direction of the second vector relative to the second optical element; and a second shading portion disposed in the other direction of the negative direction of the first vector and the positive direction of the second vector relative to the third optical element. Since the optical module includes the first shading portion, it is possible to reduce stray light output from the second optical element in the positive direction of the first vector or the negative direction of the second vector and light returned without being modulated. Since the optical module includes the second shading portion, it is possible to reduce stray light output from the third optical element in the negative direction of the first vector or the positive direction of the second vector and light returned without being modulated.

In the optical module, at least one of the first and second polarization control elements may comprise one of a polarizing plate, a wavelength plate, a Faraday rotator, and a variable polarization rotator. Accordingly, it is possible to realize various modulation modes.

In the optical module, at least one of the first and second polarization control elements may be detachable. Accordingly, it is possible to realize more various modulation modes.

The optical module may further include a mechanism configured to allow at least one of the first and second polarization control elements to rotate about an optical axis. Accordingly, it is possible to realize more various modulation modes.

In the optical module, at least one of the first and second reflective light modulator may comprise a spatial light modulator or an electro-optic modulator. Accordingly, it is possible to construct an light modulator with a small size and to decrease the size of the optical module as a whole.

The optical module may further include a mechanism configured to allow at least one of the first and second reflective light modulators to rotate about an optical axis. Accordingly, it is possible to realize more various modulation modes.

According to the optical module according to the aspect of the present invention, it is possible to simply realize various modulation modes.

BRIEF DESCRIPTION OF THE DRAWINGS

FIG. 5A is a diagram illustrating an operation related on intensity modulation by the optical module and illustrating an example in which the second and third optical elements are polarization beam splitters;

FIG. 5B is a diagram illustrating an operation related on phase modulation by the optical module and illustrating an example in which the second and third optical elements are polarization beam splitters;

FIG. 6A is a diagram illustrating an operation related on intensity modulation by the optical module and illustrating an example in which the second and third optical elements are half mirrors;

FIG. 6B is a diagram illustrating an operation related on phase modulation by the optical module and illustrating an example in which the second and third optical elements are half mirrors;

FIG. 6C is a diagram illustrating an operation related on polarization modulation by the optical module and illustrating an example in which the second and third optical elements are half mirrors;

FIG. 7 is a chart illustrating a relationship between modulation functions and the optical elements (the polarization control elements and the light modulators) and illustrating an example in which the second and third optical elements are polarization beam splitters;

FIG. 8 is a chart illustrating a relationship between modulation functions and the optical elements (the polarization control elements and the light modulators) and illustrating an example in which the second and third optical elements are half mirrors;

FIG. 9A is a chart illustrating types of the modulation functions in the first mode of the optical module;

FIG. 9B is a chart illustrating types of the modulation functions in the second mode of the optical module;

FIG. 9C is a chart illustrating types of the modulation functions in the third mode of the optical module;

DETAILED DESCRIPTION

Figure 1:
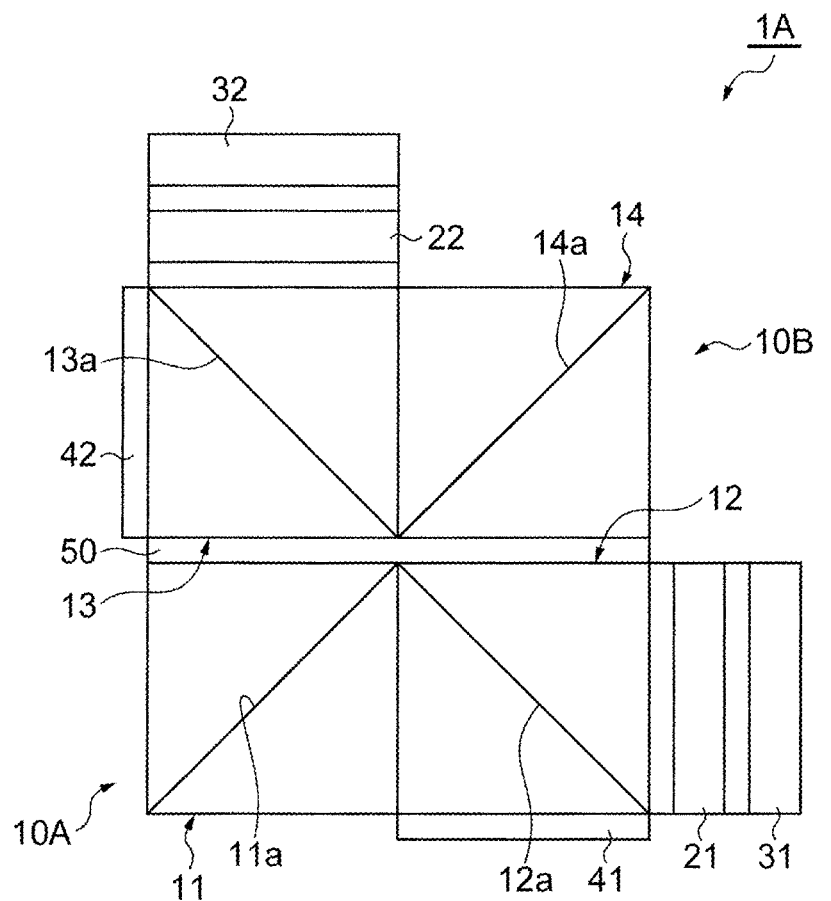
FIG. 1 is a plan view illustrating a configuration of an optical module according to a first embodiment.

Hereinafter, an optical module according to embodiments will be described in detail with reference to the accompanying drawings. In description with reference to the drawings, like elements will be referenced by like reference numerals and description thereof will not be repeated.

First Embodiment

FIG. 1 is a plan view illustrating a configuration of an optical module 1A according to a first embodiment. In FIG. 1, a coordinate system including an X-axis vector (a first vector) and a Y-axis vector (a second vector) which intersect each other (which are perpendicular to each other in an example) is illustrated. As illustrated in FIG. 1, the optical module 1A includes a first optical element 11, a second optical element 12, a third optical element 13, and a fourth optical element 14. The optical module 1A includes a first polarization control element 21, a first light modulator 31, a second polarization control element 22, a second light modulator 32, a first shading portion 41, and a second shading portion 42.

The optical elements 11 and 14 are cubic prisms and have a wavelength selection surface 11a (a first wavelength selection surface) and a wavelength selection surface 14a (a second wavelength selection surface), respectively. At least one of the wavelength selection surfaces 11a and 14a (for example, both) is a wavelength selecting filter or a dichroic mirror which is formed of a dielectric multilayer film. The wavelength selection surface 11a transmits a first beam and reflects a second beam having a wavelength other than that of the first beam. For example, the wavelength selection surface 11a demultiplexes first and second beams having different wavelengths which are incident coaxially in a positive direction of the X-axis vector or the Y-axis vector by reflecting and transmitting the first and second beams in the positive directions of the X-axis vector and the Y-axis vector. The wavelength selection surface 14a reflects one beam of the first and second beams having different wavelengths and transmits the other beam. For example, the wavelength selection surface 14a multiplexes the first beam incident in the positive direction of the Y-axis vector and the second beam incident in the positive direction of the X-axis vector.

The planar shapes of the optical elements 11 and 14 are square and the wavelength selection surfaces 11a and 14a are disposed on the diagonals thereof, respectively. The wavelength selection surfaces 11a and 14a are disposed at an angle at which light incident in the positive direction of one of the X-axis vector and the Y-axis vector can be reflected in the positive direction of the other of the X-axis vector and the Y-axis vector. That is, the wavelength selection surfaces 11a and 14a are inclined to the X-axis vector and the Y-axis vector and when the vectors are perpendicular to each other, the angle formed by the wavelength selection surfaces 11a and 14a with respect to the X-axis vector is, for example, 45° in a counterclockwise direction.

The optical elements 12 and 13 are cubic prisms and have reflection surfaces 12a and 13a, respectively. The optical element 12 transmits at least a part of light incident in the positive direction of the X-axis vector and reflects at least a part of light returned from the light modulator 31 via the polarization control element 21 in the positive direction of the Y-axis vector. The optical element 13 transmits at least a part of light incident in the positive direction of the Y-axis vector to the polarization control element 22 and reflects at least a part of light returned from the light modulator 32 via the polarization control element 22 in the positive direction of the X-axis vector. At least one (for example, both) of the optical elements 12 and 13 is a polarization beam splitter or a half mirror. In an example, both of the optical elements 12 and 13 are polarization beam splitters. In another example, both of the optical elements 12 and 13 are half mirrors.

At least one (for example, both) of the polarization control elements 21 and 22 is one of a polarizing plate (a polarizer), a wavelength plate, a Faraday rotator, and a variable polarization rotator (variable rotator). In an example, both of the polarization control elements 21 and 22 are polarizing plates. In another example, both of the polarization control elements 21 and 22 are wavelength plates (for example, a λ/2 plate or a λ/4 plate). In another example, both of the polarization control elements 21 and 22 are Faraday rotators. At least one (for example, both) of the polarization control elements 21 and 22 is detachable. That is, the polarization control element 21 can be detached from between the optical element 12 and the light modulator 31. The polarization control element 22 can be detached from between the optical element 13 and the light modulator 32. At least one (for example, both) of the polarization control elements 21 and 22 includes a mechanism that is rotatable about an optical axis. That is, the polarization control element 21 is rotatable about an optical axis parallel to the X-axis vector and the polarization control element 22 is rotatable about an optical axis parallel to the Y-axis vector. The optical axes of the polarization control elements 21 and 22 are, for example, axes passing through the centers of light-transmitting areas of the polarization control elements 21 and 22.

The light modulators 31 and 32 are reflective light modulators. At least one (for example, both) of the light modulators 31 and 32 is a spatial light modulator (SLM) or an electro-optic (EO) modulator. The spatial light modulator is, for example, of a liquid crystal type. At least one (for example, both) of the light modulators 31 and 32 includes a mechanism that is rotatable about an optical axis. That is, the light modulator 31 is rotatable about an optical axis parallel to the X-axis vector and the light modulator 32 is rotatable about an optical axis parallel to the Y-axis vector. The axes of the light modulators 31 and 32 are, for example, axes passing through the centers of modulation surfaces of the light modulators 31 and 32.

The optical element 11, the optical element 12, the polarization control element 21, and the light modulator 31 are sequentially arranged in the positive direction of the X-axis vector and are optically coupled to each other in this order. An optical element group including the optical elements 13 and 14 is located in the positive direction of the Y-axis vector relative to an optical element group including the optical elements 11 and 12. The optical elements 13 and 14 are sequentially arranged in the positive direction of the X-axis vector and are optically coupled to each other. The polarization control element 22 and the light modulator 32 are sequentially arranged in the positive direction of the Y-axis vector from the optical element 13, and the optical element 13, the polarization control element 22, and the light modulator 32 are optically coupled to each other in this order. The shading portion 41 is disposed in the negative direction of the Y-axis vector relative to the optical element 12 and is optically coupled to the optical element 12. The shading portion 42 is disposed in the negative direction of the X-axis vector relative to the optical element 13 and is optically coupled to the optical element 13. In this embodiment, the shading portions 41 and 42 are bonded to side surfaces of the optical elements 12 and 13, respectively. The shading portion 41 absorbs light traveling in the negative direction of the Y-axis vector from the reflection surface 12a of the optical element 12. The shading portion 42 absorbs light traveling in the negative direction of the X-axis vector from the reflection surface 13a of the optical element 13.

The optical module 1A further includes a sliding mechanism 50. The sliding mechanism 50 causes the optical elements 11 and 12 and the optical element2 13 and 14 to relatively move in the direction parallel to the X-axis vector (the positive direction and the negative direction). The sliding mechanism 50 in this embodiment causes a first optical component group 10A including the optical elements 11 and 12, the polarization control element 21, the light modulator 31, and the shading portion 41 and a second optical component group 10B including the optical elements 13 and 14, the polarization control element 22, the light modulator 32, and the shading portion 42 to relatively move in the direction parallel to the X-axis vector. For example, the sliding mechanism 50 causes the first optical component group 10A to move in the direction parallel to the X-axis vector relative to the second optical component group 10B. Alternatively, the sliding mechanism 50 may cause the second optical component group 10B to move in the direction parallel to the X-axis vector relative to the first optical component group 10A. Alternatively, the sliding mechanism 50 may cause both of the first and second optical component groups 10A and 10B to move in the direction parallel to the X-axis vector relative to each other.

When the relative positional relationship between the first optical component group 10A and the second optical component group 10B is the relationship illustrated in FIG. 1, the optical element 13 is located in the positive direction of the Y-axis vector relative to the optical element 11 and these optical elements are optically coupled to each other. The optical element 14 is located in the positive direction of the Y-axis vector relative to the optical element 12 and these optical elements are optically coupled to each other. When the first optical component group 10A moves in the negative direction of the X-axis vector relative to the second optical component group 10B, the optical element 13 is located in the positive direction of the Y-axis vector relative to the optical element 12 and these optical elements are optically coupled to each other. When the first optical component group 10A moves in the positive direction of the X-axis vector relative to the second optical component group 10B, the optical element 14 is located in the positive direction of the Y-axis vector relative to the optical element 11 and these optical elements are optically coupled to each other.

Figure 2:
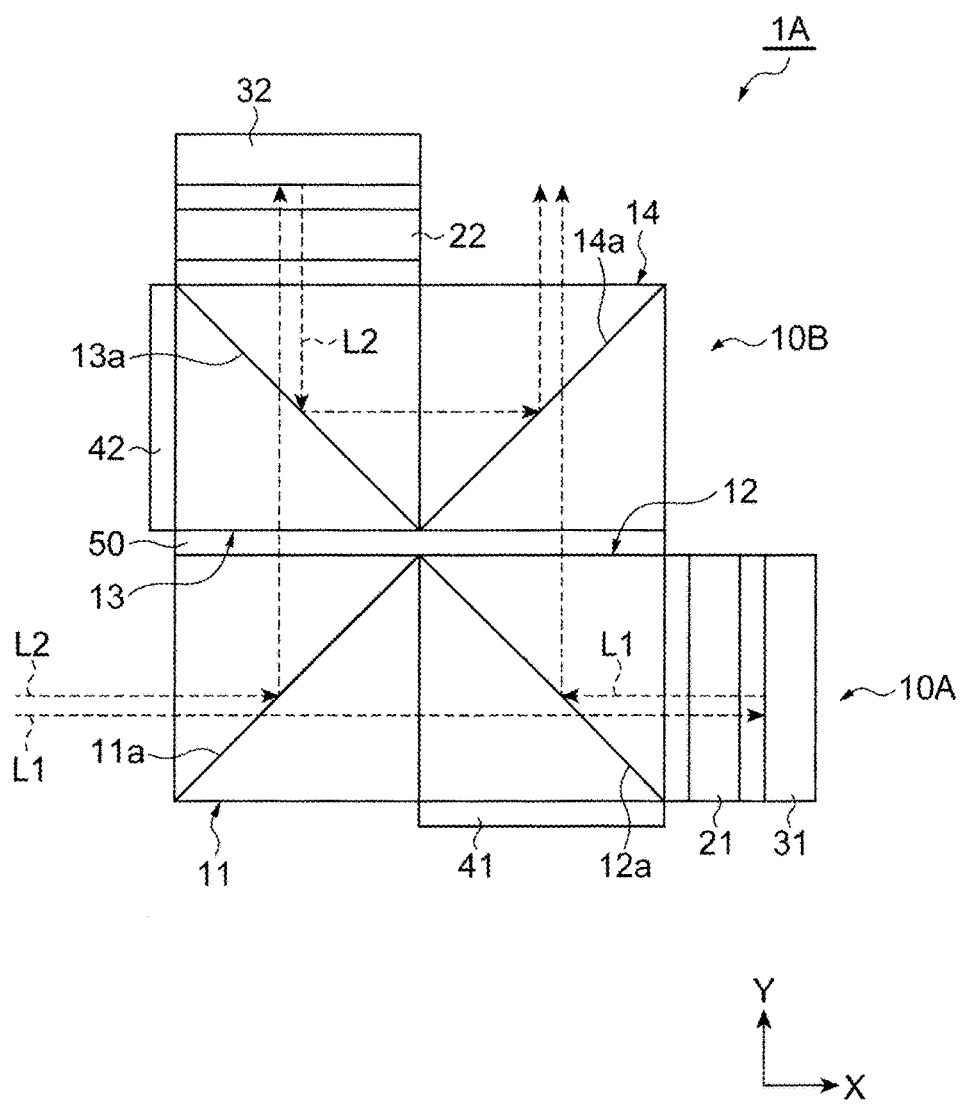
FIG. 2 is a diagram illustrating a mode (a first mode) in which first and second optical elements are optically coupled to third and fourth optical elements, respectively.
Figure 3:
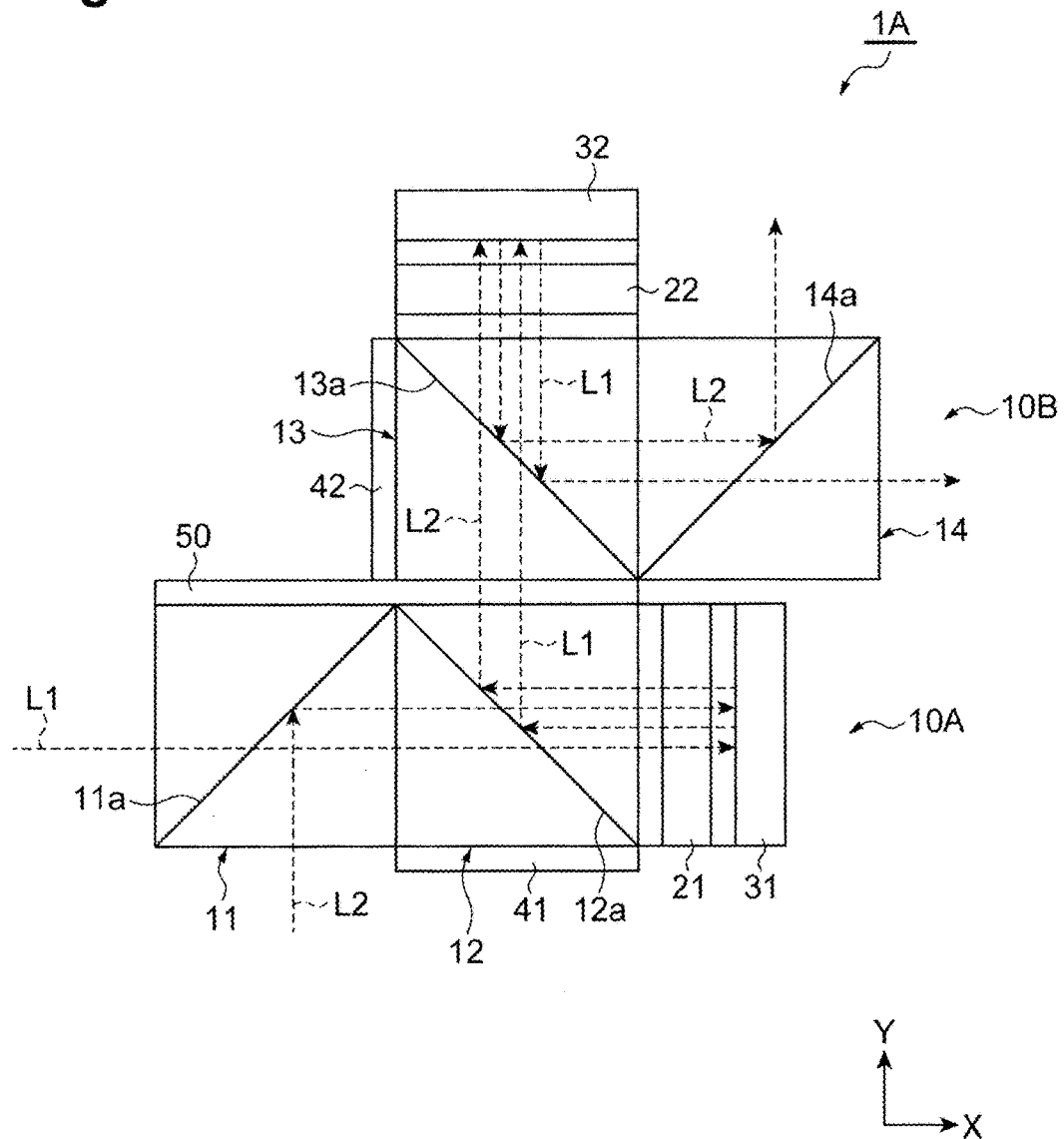
FIG. 3 is a diagram illustrating a mode (a second mode) in which the second optical element is optically coupled to the third optical element.
Figure 4:
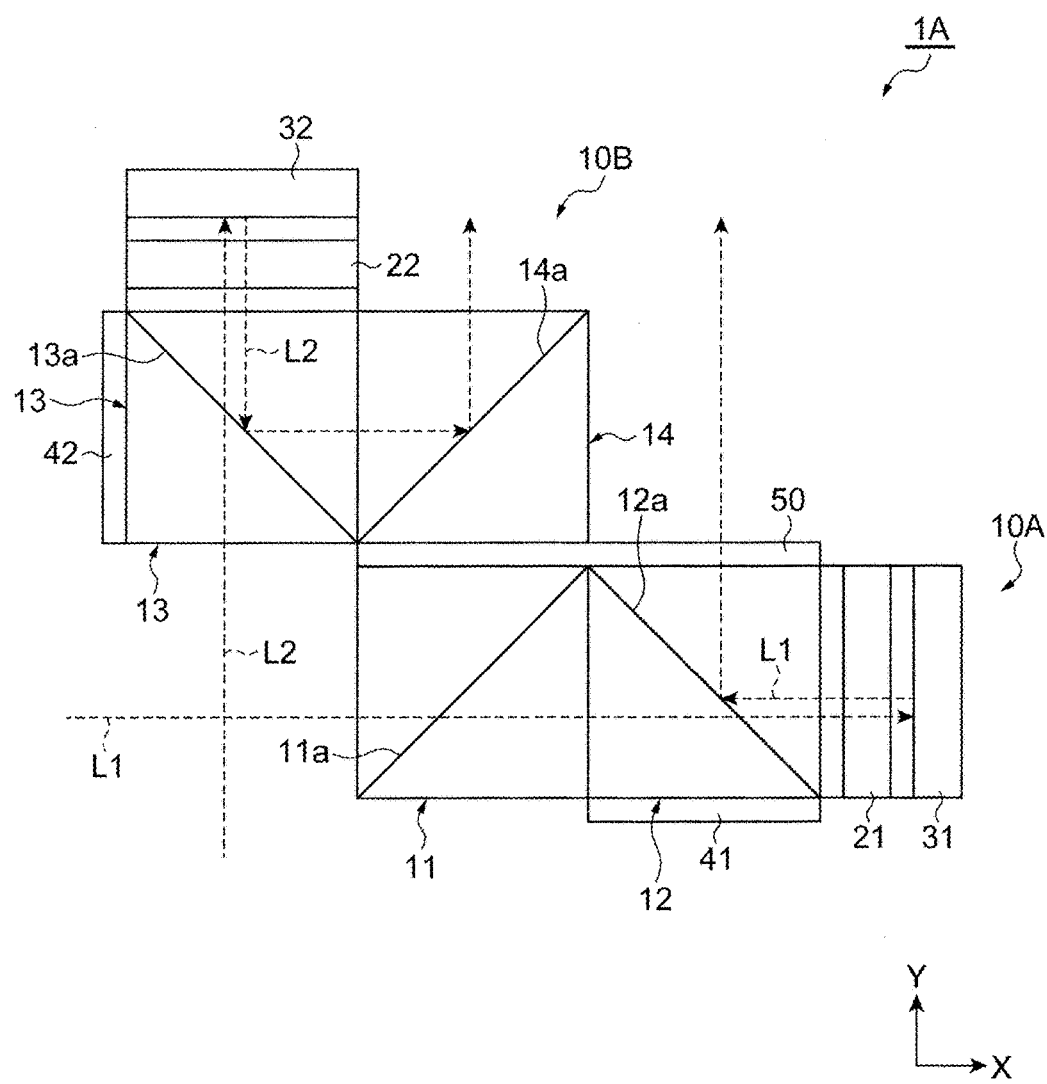
FIG. 4 is a diagram illustrating a mode (a third mode) in which the first optical element is optically coupled to the fourth optical element.

FIGS. 2 to 4 are diagrams illustrating examples of movement of the optical module 1A. FIG. 2 illustrates a mode (a first mode) in which the optical elements 11 and 12 are optically coupled to the optical elements 13 and 14, respectively by the sliding mechanism 50. FIG. 3 illustrates a mode (a second mode) in which the optical element 12 is optically coupled to the optical element 13 by the sliding mechanism 50. FIG. 4 illustrates a mode (a third mode) in which the optical element 11 is optically coupled to the optical element 14 by the sliding mechanism 50. In FIGS. 2 to 4, the optical axes of beams L1 and L2 are deviated from each other for the purpose of easy understanding, but the optical axes may match each other. The optical axes of an incident beam and a reflected beam of the light modulators 31 and 32 are deviated from each other for the purpose of easy understanding, but these optical axes actually match each other.

In the mode illustrated in FIG. 2, a beam L1 and a beam L2 having different wavelengths are incident on the optical element 11 in the positive direction of the X-axis vector. The beam L1 is, for example, red light with a wavelength of 780 nm and corresponds to a first beam in this embodiment. The beam L2 is, for example, blue light with a wavelength of 480 nm and corresponds to a second beam in this embodiment. The beam L1 is transmitted in the positive direction of the X-axis vector by the wavelength selection surface 11a and is then incident on the optical element 12. At least a part of the beam 11 is transmitted by the reflection surface 12a. At this time, a partial beam reflected in the negative direction of the Y-axis vector by the reflection surface 12a is incident on and absorbed by the shading portion 41. Subsequently, the beam L1 is transmitted by the polarization control element 21. At this time, the beam L1 is subjected to an operation (such as selection of a polarization surface and rotation) by the polarization control element 21. Thereafter, the beam L1 reaches the light modulator 31 and is subjected to phase modulation or the like by the light modulator 31. The modulated beam L1 is subjected to an operation by the polarization control element 21 and is then returned to the reflection surface 12a, and at least a part thereof is reflected in the positive direction of the Y-axis vector by the reflection surface 12a and is incident on the optical element 14. The beam L1 is transmitted in the positive direction of the Y-axis vector by the wavelength selection surface 14a.

The beam L2 is reflected in the positive direction of the Y-axis vector by the wavelength selection surface 11a and is then incident on the optical element 13. At least a part of the beam L2 is transmitted by the reflection surface 13a. At this time, a partial beam reflected in the negative direction of the X-axis vector by the reflection surface 13a is incident on and absorbed by the shading portion 42. Subsequently, the beam L2 passes through the polarization control element 22. At this time, the beam L2 is subjected to an operation (such as selection of a polarization surface and rotation) by the polarization control element 22. Thereafter, the beam L2 reaches the light modulator 32 and is subjected to phase modulation or the like by the light modulator 32. The modulated beam L2 is subjected to an operation by the polarization control element 22 and is then returned to the reflection surface 13a, and at least a part thereof is reflected in the positive direction of the X-axis vector by the reflection surface 13a and is then incident on the optical element 14. The beam L2 is reflected in the positive direction of the Y-axis vector by the wavelength selection surface 14a. Accordingly, the modulated beams L1 and L2 are multiplexed together.

In the mode illustrated in FIG. 2, the beams L1 and L2 are incident on the optical element 11 in the positive direction of the X-axis vector, but the beams L1 and L2 may be incident on the optical element 11 in the positive direction of the Y-axis vector. In this case, the beam L1 (the second beam in this case) can be reflected by the wavelength selection surface 11a and the beam L2 (the first beam in this case) can be transmitted by the wavelength selection surface 11a. In the mode illustrated in FIG. 2, the beams L1 and L2 are multiplexed together by causing the wavelength selection surface 14a to transmit the beam L1 and causing the wavelength selection surface 14a to reflect the beam L2, but the beams L1 and L2 may be multiplexed together by causing the wavelength selection surface 14a to reflect the beam L1 and causing the wavelength selection surface 14a to transmit the beam L2.

In the mode illustrated in FIG. 3, the beam L1 is incident on the optical element 11 in the positive direction of the X-axis vector and is transmitted in the positive direction of the X-axis vector by the wavelength selection surface 11a. On the other hand, the beam L2 is incident on the optical element 11 in the positive direction of the Y-axis vector and is reflected in the positive direction of the X-axis vector by the wavelength selection surface 11a. Accordingly, the traveling directions of the beams L1 and L2 are arranged. The beams L1 and L2 are incident on the optical element 12 and at least a part thereof is transmitted by the reflection surface 12a. At this time, a partial beam reflected in the negative direction of the Y-axis vector by the reflection surface 12a is incident on and absorbed by the shading portion 41. Subsequently, the beams L1 and L2 pass through the polarization control element 21. At this time, the beams L1 and L2 are subjected to an operation (such as selection of a polarization surface and rotation) by the polarization control element 21. Thereafter, the beams L1 and L2 reach the light modulator 31 and are subjected to phase modulation or the like by the light modulator 31. The modulated beams L1 and L2 are subjected to an operation by the polarization control element 21 and are then returned to the reflection surface 12a, and at least a part thereof is reflected in the positive direction of the Y-axis vector by the reflection surface 12a and is then incident on the optical element 13.

At least a part of the beams L1 and L2 is transmitted by the reflection surface 13a. At this time, a partial beam reflected in the negative direction of the X-axis vector by the reflection surface 13a is incident on and absorbed by the shading portion 42. Subsequently, the beams L1 and L2 pass through the polarization control element 22. At this time, the beams L1 and L2 are subjected to an operation (such as selection of a polarization surface and rotation) by the polarization control element 22. Thereafter, the beams L1 and L2 reach the light modulator 32 and are subjected to phase modulation or the like by the light modulator 32. The modulated beams L1 and L2 are subjected to an operation by the polarization control element 22 and are then returned to the reflection surface 13a, and at least a part thereof is reflected in the positive direction of the X-axis vector by the reflection surface 13a and is then incident on the optical element 14. The beam L1 is transmitted in the positive direction of the X-axis vector by the wavelength selection surface 14a. The beam L2 is reflected in the positive direction of the Y-axis vector by the wavelength selection surface 14a.

In the mode illustrated in FIG. 4, the beam L1 is incident on the optical element 11 in the positive direction of the X-axis vector. The beam L1 is transmitted in the positive direction of the X-axis vector by the wavelength selection surface 11a and is then incident on the optical element 12. At least a part of the beam L1 is transmitted by the reflection surface 12a. At this time, a partial beam reflected in the negative direction of the Y-axis vector by the reflection surface 12a is incident on and absorbed by the shading portion 41. Subsequently, the beam L1 passes through the polarization control element 21. At this time, the beam L1 is subjected to an operation (such as selection of a polarization surface and rotation) by the polarization control element 21. Thereafter, the beam L1 reaches the light modulator 31 and is subjected to phase modulation or the like by the light modulator 31. The modulated beam L1 is subjected to an operation by the polarization control element 21 and is then returned to the reflection surface 12a, and at least a part thereof is reflected in the positive direction of the Y-axis vector by the reflection surface 12a.

The beam L2 is incident on the optical element 13 in the positive direction of the Y-axis vector. At least a part of the beam L2 is transmitted by the reflection surface 13a. At this time, a partial beam reflected in the negative direction of the X-axis vector by the reflection surface 13a is incident on and absorbed by the shading portion 42. Subsequently, the beam L2 passes through the polarization control element 22. At this time, the beam L2 is subjected to an operation (such as selection of a polarization surface and rotation) by the polarization control element 22. Thereafter, the L2 reaches the light modulator 32 and is subjected to phase modulation or the like by the light modulator 32. The modulated beam L2 is subjected to an operation by the polarization control element 22 and is then returned to the reflection surface 13a, and at least a part thereof is reflected in the positive direction of the X-axis vector by the reflection surface 13a and is then incident on the optical element 14. The beam. L2 is reflected in the positive direction of the Y-axis vector by the wavelength selection surface 14a.

FIG. 5A is a diagram illustrating an operation related on intensity modulation by the optical module 1A according to this embodiment and illustrates an example in which the optical elements 12 and 13 are polarization beam splitters. FIG. 5B is a diagram illustrating an operation related on phase modulation by the optical module 1A according to this embodiment and illustrates an example in which the optical elements 12 and 13 are polarization beam splitters. When the polarization beam splitters are used, light intensity is not reduced by half whenever light passes unlike the half mirror and it is thus possible to enhance light use efficiency in comparison with a case in which the half mirrors are used.

As illustrated in FIG. 5A, the polarization control elements 21 and 22 are unnecessary and are thus detached in the intensity modulation. Accordingly, linearly polarized (with an polarization angle of 0°, an arrow A1 in the drawing) beams L1 and L2 transmitted by the optical elements 12 and 13 which are the polarization beam splitters are directly incident on the light modulators 31 and 32. Here, it is assumed that the light modulators 31 and 32 have polarization dependency and modulate only a beam in a predetermined polarization direction A2. The polarization direction A2 is inclined to a polarization direction A1 of the beams L1 and L2, for example, by 45°. At this time, only a component in the polarization direction A2 among the beams L1 and L2 is modulated and a component in a polarization direction A3 perpendicular to the polarization direction A2 are not modulated. Accordingly, for example, when a time delay is given to only the component in the polarization direction A2, there is a time difference $\Delta$ between the components in the polarization directions A2 and A3 (a retardation effect). The time difference $\Delta$ A is dependent on a voltage v which is applied to the light modulators 31 and 32. When the polarization components are reflected by the optical elements 12 and 13 which are the polarization beam splitters, linearly polarized beams L1 and L2 having a polarization direction A4 perpendicular to the polarization direction A1 are acquired. The light intensity In of the beams L1 and L2 is expressed by In=sin($\Delta$+$\pi$/4) and the light intensity In can be controlled to an arbitrary magnitude by changing the voltage v which is applied to the light modulators 31 and 32.

In the phase modulation illustrated in FIG. 5B, polarization plates are used as the polarization control elements 21 and 22.

Accordingly, in the polarization direction A1 of the beams L1 and L2 transmitted by the optical elements 12 and 13 which are the polarization beam splitters, only the component in the polarization direction A5 of the polarization control elements 12 and 22 which are the polarizing plates is extracted. The polarization direction A5 of the polarization control elements 21 and 22 forms, for example, 45° about the polarization direction A1. The beams L1 and L2 having the polarization direction A5 are incident on the light modulators 31 and 32. Here, when the polarization direction of the light modulators 31 and 32 having polarization dependency is set to the same angle as the polarization direction A5, the retardation effect is not caused and only the phases of almost all the beams L1 and L2 is modulated by the light modulators 31 and 32. At this time, a time delay $\Delta$ is given to the beams L1 and L2. The time delay $\Delta$ is dependent on the voltage v which is applied to the light modulators 31 and 32. Thereafter, the beams L1 and L2 pass through the polarization control elements 21 and 22 and are returned to the optical elements 12 and 13. Only the component in the polarization direction A4 perpendicular to the polarization direction A1 of the initial beams L1 and L2 is reflected by the optical elements 12 and 13 which are the polarization beam splitters. Since the phases of the beams L1 and L2 at this time match the time delay $\Delta$, the phases of the beams can be controlled to an arbitrary phase by changing the voltage v which is applied to the light modulators 31 and 32.

In this example, the light intensities of the beams L1 and L2 are reduced by half due to a polarization filter effect of the optical elements 12 and 13. On the other hand, when Faraday rotators instead of the polarizing plates are used as the polarization control elements 21 and 22 and the polarization direction of the light modulators 31 and 32 is set to the same angle as the polarization direction A1, it is possible to suppress the reduction in light intensity in the optical elements 12 and 13 by change of the polarization direction.

In this example, when light modulators having polarization independency are used as the light modulators 31 and 32, the retardation effect is not caused, but the phase modulation can be performed by setting the polarization direction of the $\lambda$/4 plate to 45° about the polarization direction A1 and causing circularly polarized light to be incident on the light modulators 31 and 32.

FIG. 6A is a diagram illustrating an operation related on intensity modulation by the optical module 1A according to this embodiment and illustrates an example in which the optical elements 12 and 13 are half mirrors. FIG. 6B is a diagram illustrating an operation related on phase modulation by the optical module 1A according to this embodiment and illustrates an example in which the optical elements 12 and 13 are half mirrors. FIG. 6C is a diagram illustrating an operation related on polarization modulation by the optical module 1A according to this embodiment and illustrates an example in which the optical elements 12 and 13 are half mirrors. A half mirror does not have a polarization filter effect unlike the polarization beam splitter. Accordingly, the rotation angle of the light modulators 31 and 32 is not limited and only the angle formed by the light modulators 31 and 32 and the polarization control elements 21 and 22 has only to be considered.

In the intensity modulation illustrated in FIG. 6A, polarizing plates are used as the polarization control elements 21 and 22. Accordingly, only a component in a polarization direction A8 of the polarization control elements 21 and 22 among polarization directions A7 of the beams L1 and L2 transmitted by the optical elements 12 and 13 which are half mirrors is extracted. The polarization direction A8 of the polarization control elements 21 and 22 form, for example, 45° about the polarization direction A7. Then, the beams L1 and L2 having the polarization direction A8 are incident on the light modulators 31 and 32. Here, when the polarization direction of the light modulators 31 and 32 having polarization dependency is set, for example, to the same angle as the polarization direction A7, only the component in the polarization direction A7 is modulated and the component in a polarization direction A9 perpendicular to the polarization direction A7 is not modulated. Accordingly, for example, when a time delay is given to only the component in the polarization direction A7, a time difference $\Delta$ occurs between the components in the polarization directions A7 and A9. The time difference $\Delta$ is dependent on the voltage v which is applied to the light modulators 31 and 32. Thereafter, when passing through the polarization control elements 21 and 22, the components in the polarization directions A7 and A9 are adjusted to light intensity based on the time difference $\Delta$. That is, the light intensity In of the beams L1 and L2 is expressed by In=sin($\Delta$+$\pi$/4) and the light intensity In can be controlled to an arbitrary magnitude by changing the voltage v which is applied to the light modulators 31 and 32.

In the phase modulation illustrated in FIG. 6B, polarizing plates are used as the polarization control elements 21 and 22, but the polarization direction of the polarization control elements 21 and 22 is set to match an arbitrary polarization direction A7 of the beams L1 and L2 transmitted by the optical elements 12 and 13 which are half mirrors. Accordingly, the beams L1 and L2 having the polarization direction A7 are incident on the light modulators 31 and 32. Here, when the polarization direction of the light modulators 31 and 32 having polarization dependency is set to the same angle as the polarization direction A7, almost all the beams L1 and L2 are modulated by the light modulators 31 and 32. At this time, a time delay $\Delta$ is given to the beams L1 and L2. The time delay $\Delta$ is dependent on the voltage v which is applied to the light modulators 31 and 32. Thereafter, the beams L1 and L2 pass through the polarization control elements 21 and 22 and are reflected by the optical elements 12 and 13. Since the phases of the beams L1 and L2 at this time match the time delay Δ, the phases of the beams can be controlled to an arbitrary phase by changing the voltage v which is applied to the light modulators 31 and 32.

In the polarization modulation illustrated in FIG. 6C, λ/4 plates are used as the polarization control elements 21 and 22. Accordingly, when the beams L1 and L2 transmitted by the optical elements 12 and 13 which are half mirrors pass through the polarization control elements 21 and 22, a time difference λ/4 occurs between the component in the polarization direction A7 and the component in the polarization direction A9 perpendicular to the polarization direction A7. When a predetermined polarization direction of the light modulators 31 and 32 having polarization dependency is set, for example, to the same angle as the polarization direction A7, only the retardation effect can be achieved. That is, only the component in the polarization direction A7 is modulated and the component in the polarization direction A9 is not modulated. Accordingly, for example, when a time delay is given to only the component in the polarization direction A7, a time difference (Δ+λ/4) occurs between the components in the polarization directions A7 and A9. The time difference Δ is dependent on the voltage v which is applied to the light modulators 31 and 32. Thereafter, the time difference between the components in the polarization directions A7 and A9 increases again by λ/4 in the polarization control elements 21 and 22 which are λ/4 plates and becomes (Δ+λ/2). When the polarization components pass through the optical elements 12 and 13, beams L1 and L2 in the following polarization states are obtained depending on the value of Δ.

Δ=λ/2: linearly polarized beam

Δ=λ/4: circularly polarized beam

Other values of Δ: elliptically polarized beam

That is, the polarization state can be controlled to an arbitrary polarization state by changing the voltage v which is applied to the light modulators 31 and 32

In the modes illustrated in FIG. 5A to 6C are only examples of the intensity modulation, the phase modulation, and the polarization modulation and various other modes can be realized. FIGS. 7 and 8 are charts in which relationships between the modulation function and the optical elements (the polarization control elements 21 and 22 and the light modulators 31 and 32) are arranged. FIG. 7 illustrates an example in which the optical elements 12 and 13 polarization beam splitters (see FIGS. 5A and 5B) and FIG. 8 illustrates an example in which the optical elements 12 and 13 are half mirrors (see FIGS. 6A to 6C). In FIGS. 7 and 8, "NULL" represents that the corresponding element is not disposed, and each numerical value represents an angle (unit: degrees) of the polarization direction of the corresponding element. "X" represents an angle of the polarization direction of an incident beam, and "Y" represents that an angle of the polarization direction is arbitrary.

An example in which the optical elements 12 and 13 are polarization beam splitters will be described below. As illustrated in FIG. 7, at least one mode is considered for the intensity modulation. That is, any of a polarizing plate, a ¼ plate, a Faraday rotator, and a variable polarization rotator is not disposed as the polarization control elements 21 and 22. Uniaxial light modulators (having polarization dependency) are used as the light modulators 31 and 32 and the angle of the polarization direction thereof is, for example, 45°. For the phase modulation, at least three modes (1) to (3) are considered. That is, (1) polarizing plates are used as the polarization control elements 21 and 22 and the angle of the polarization direction is, for example, 45°. Uniaxial light modulators (having polarization dependency) are used as the light modulators 31 and 32 and the angle of the polarization direction is, for example, 45°. (2) Faraday rotators are used as the polarization control elements 21 and 22 and the angle of the polarization direction is arbitrary. Uniaxial light modulators (having polarization dependency) are used as the light modulators 31 and 32 and the angle of the polarization direction is, for example, 0°. (3) λ/4 plates are used as the polarization control elements 21 and 22 and the angle of the polarization direction is, for example, 45°. Isotropic light modulators (having polarization independency) are used as the light modulators 31 and 32.

An example in which the optical elements 12 and 13 are half mirrors will be described below. As illustrated in FIG. 8, at least one mode is considered for the intensity modulation. That is, polarizing plates are used as the polarization control elements 21 and 22 and the angle of the polarization direction thereof is, for example, (45+X)°. Uniaxial light modulators (having polarization dependency) are used as the light modulators 31 and 32 and the angle of the polarization direction thereof is, for example, X°. For the phase modulation, at least two modes (4) and (5) are considered. That is, (4) polarizing plates are used as the polarization control elements 21 and 22 and the angle of the polarization direction is, for example, X°. Uniaxial light modulators (having polarization dependency) are used as the light modulators 31 and 32 and the angle of the polarization direction is, for example, X°. (5) λ/4 plates are used as the polarization control elements 21 and 22 and the angle of the polarization direction is, for example, 45°. Isotropic light modulators (having polarization independency) are used as the light modulators 31 and 32. At least one mode is considered for the polarization modulation. That is, λ/4 plates are used as the polarization control elements 21 and 22 and the angle of the polarization direction thereof is, for example, (45+X)°. Uniaxial light modulators (having polarization dependency) are used as the light modulators 31 and 32 and the angle of the polarization direction thereof is, for example, X°.

FIG. 9A is a chart illustrating types of the modulation functions in the first mode of the optical module 1A. FIG. 9B is a chart illustrating types of the modulation functions in the second mode of the optical module 1A. FIG. 9C is a chart illustrating types of the modulation functions in the third mode of the optical module 1A. In the drawings, In denotes intensity modulation, Ph denotes phase modulation, and P1 denotes polarization modulation. "A" represents that the corresponding modulation function can be realized using any one of an EO modulator and an SLM as the light modulators 31 and 32, "B" represents that the corresponding modulation function can be realized using an EO modulator as the light modulators 31 and 32, and "C" represents that the corresponding modulation function cannot be realized using any of an EO modulator and an SLM as the light modulators 31 and 32.

As illustrated in FIG. 9A, in the first mode, when the intensity modulation or the phase modulation is performed using both the light modulators 31 and 32, there are two modes of a mode using an EO modulator and a mode using an SLM. When the polarization modulation is performed using at least one of the light modulators 31 and 32, only the mode using an EO modulator is allowed. Accordingly, the first mode includes nine patterns using an EO modulator and four patterns using an SLM.

As illustrated in FIG. 9B, in the second mode, when the intensity modulation is preformed using both the light modulators 31 and 32, when the phase modulation is performed using both the light modulators 31 and 32, and when the intensity modulation is performed using the light modulator 31 and the phase modulation is performed using the light modulator 32, there are two modes of a mode using an EO modulator and a mode using an SLM. When the polarization modulation is performed using the light modulator 31 and the intensity modulation or the phase modulation is performed using the light modulator 32, only the mode using an EO modulator is allowed. Accordingly, the second mode includes five patterns using an EO modulator and three patterns using an SLM.

As illustrated in FIG. 9C, in the third mode, when the intensity modulation or the phase modulation is performed using both the light modulators 31 and 32, there are two modes of a mode using an EO modulator and a mode using an SLM. When the polarization modulation is performed using both the light modulators 31 and 32, only the mode using an EO modulator is allowed. Accordingly, the third mode includes three patterns using an EO modulator and two patterns using an SLM.

According to the above-mentioned optical module 1A according to this embodiment, it is possible to realize modulation modes of total 26 patterns.

Figure 10:
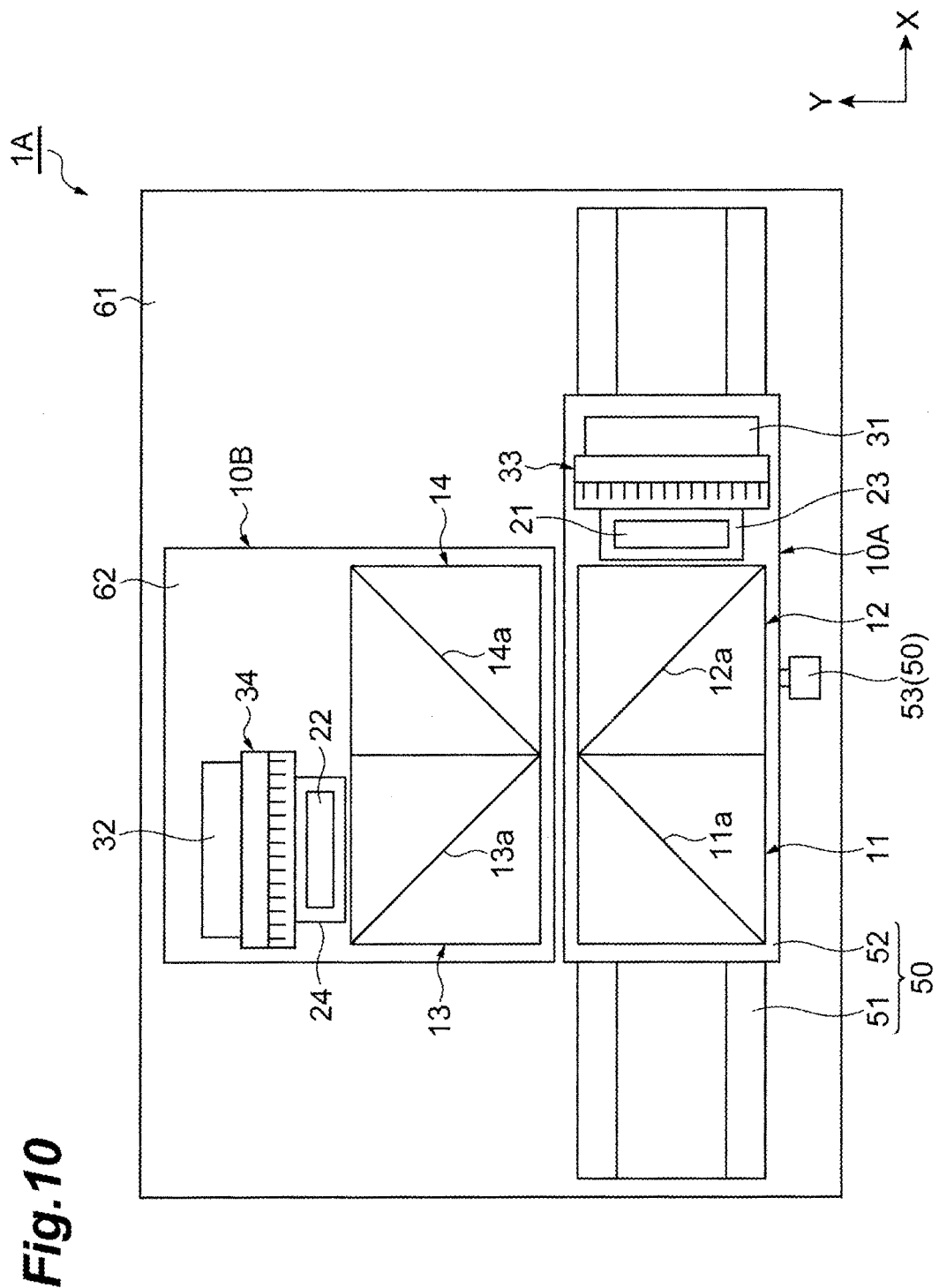
FIG. 10 is a plan view illustrating the first mode of the optical module.
Figure 11:
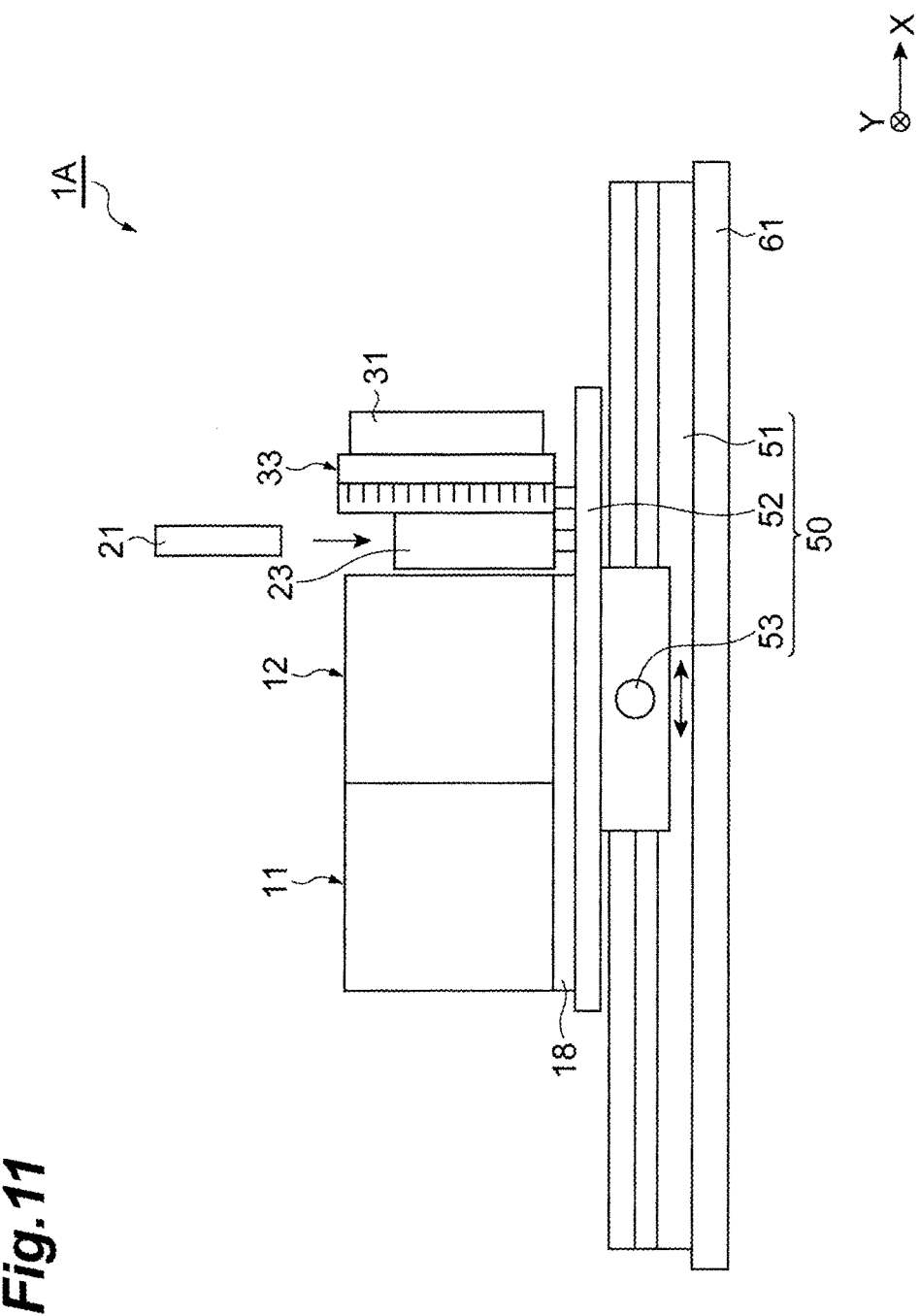
FIG. 11 is a side view of the optical module when viewed from a direction of a Y-axis vector.
Figure 12:
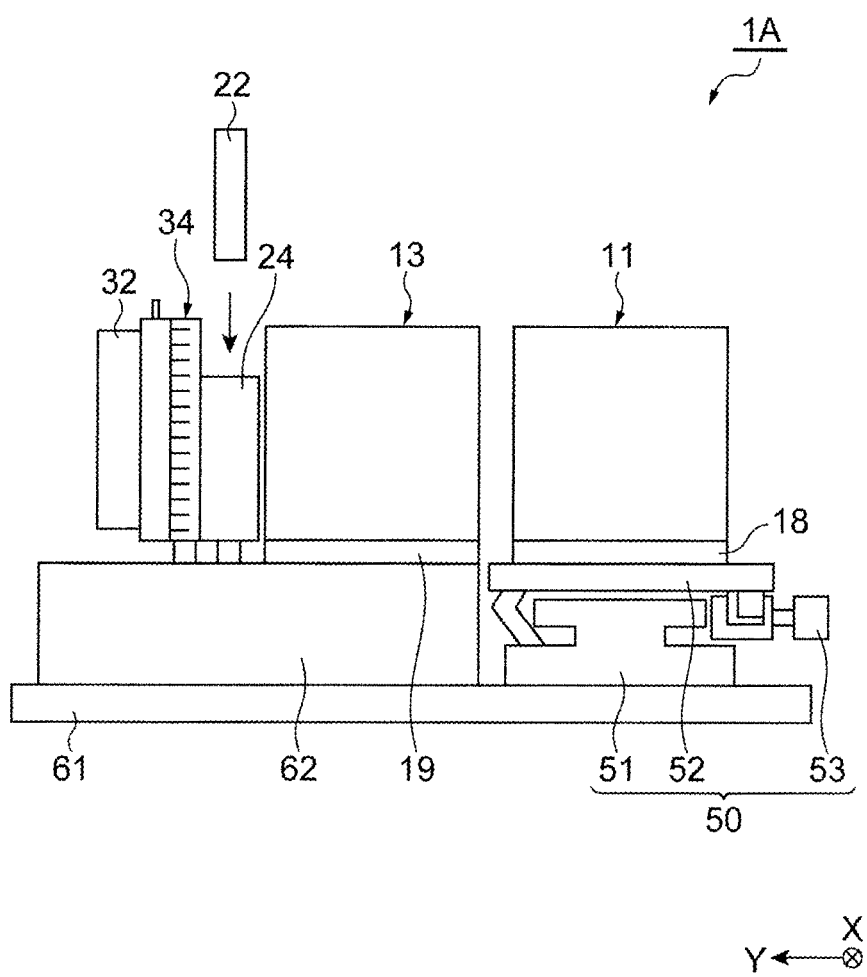
FIG. 12 is a side view of the optical module when viewed from a direction of an X-axis vector.
Figure 13:
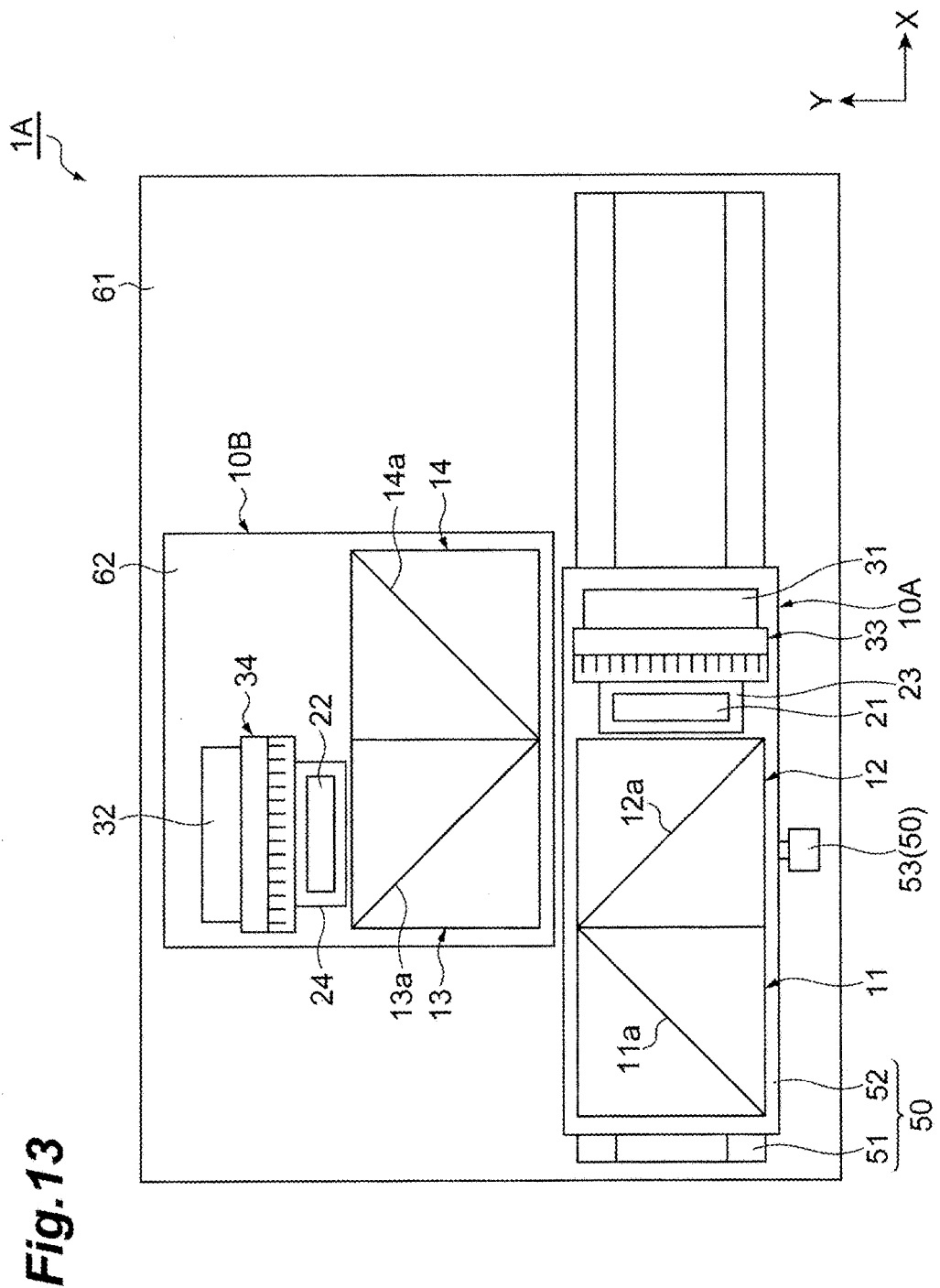
FIG. 13 is a plan view illustrating the second mode of the optical module.
Figure 14:
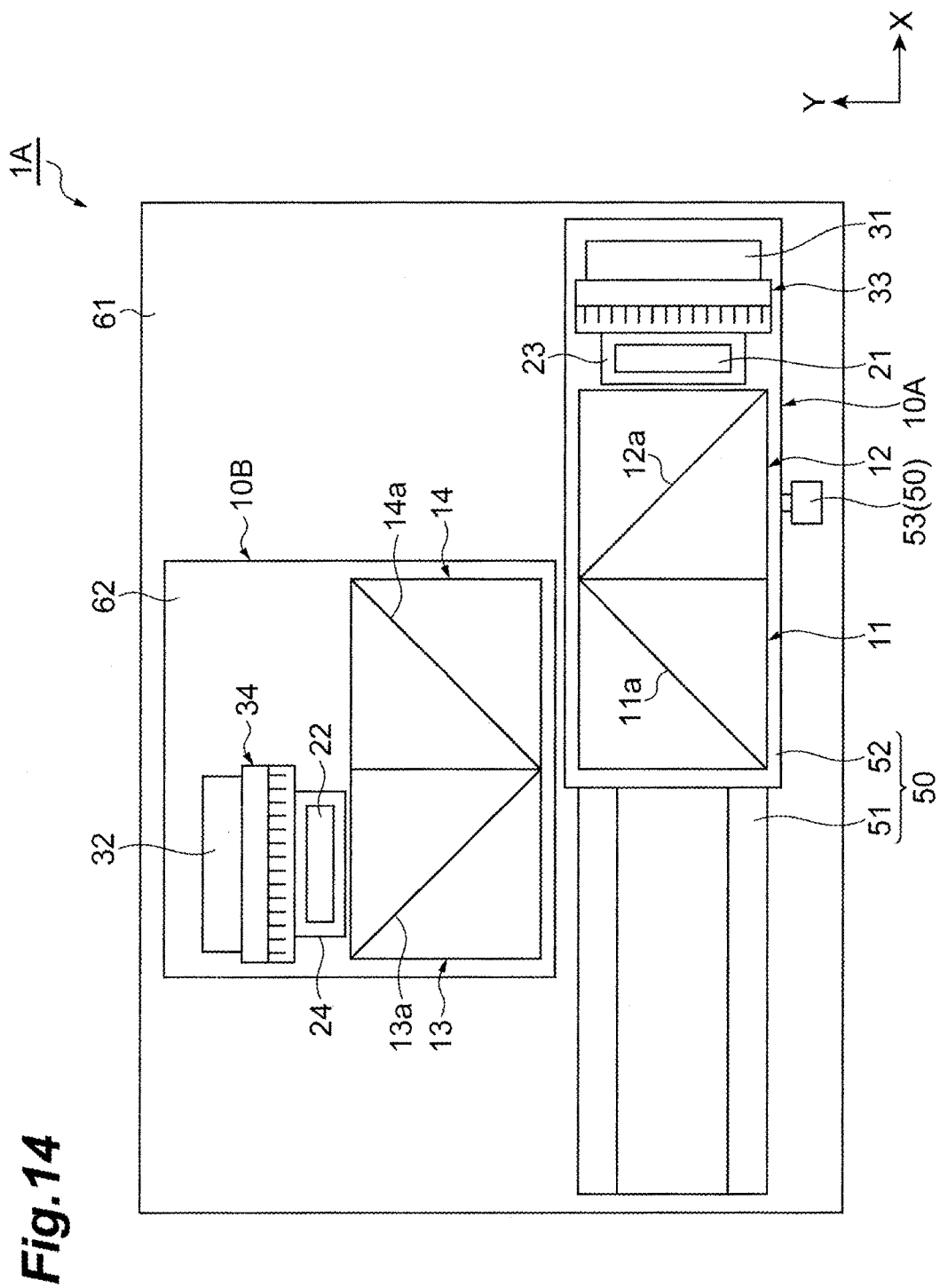
FIG. 14 is a plan view illustrating the third mode of the optical module.

Here, a specific example of a configuration of the optical module 1A will be described with reference to FIGS. 10 to 14. FIG. 10 is a plan view illustrating the first mode of the optical module 1A. FIG. 11 is a side view of the optical module 1A when viewed from the direction of the Y-axis vector. FIG. 12 is a side view of the optical module 1A when viewed from the direction of the X-axis vector. FIG. 13 is a plan view illustrating the second mode of the optical module 1A. FIG. 14 is a plan view illustrating the third mode of the optical module 1A. As illustrated in the drawings, the optical module 1A includes a flat plate-shaped breadboard 61 on which the first optical component group 10A, the second optical component group 10B, and the sliding mechanism 50 are mounted.

The first optical component group 10A includes a fixing jig 23 and a rotary holder 33 in addition to the optical elements 11 and 12, the polarization control element 21, and the light modulator 31. The fixing jig 23 is a jig for detachably fixing the polarization control element 21, includes a concave portion into which the polarization control element 21 is inserted, and is disposed between the optical element 12 and the rotary holder 33. The rotary holder 33 supports the light modulator 31 and causes the light modulator 31 to be rotatable about an optical axis. The rotary holder 33 is disposed in the positive direction of the X-axis vector relative to the optical element 12.

The first optical component group 10A is mounted on a rail bench 52 having a flat surface. Among these, the optical elements 11 and 12 are mounted on the rail bench 52 with a spacer 18 (see FIGS. 11 and 12) interposed therebetween for the purpose of height adjustment. The rail bench 52 constitutes the sliding mechanism 50 along with a rail 51 which extends along the X-axis vector. That is, the rail bench 52 is disposed to be movable in the length direction of the rail 51 and is fixed to a desired position in the direction of the X-axis vector by interposing the rail 51 with a knob 53. Accordingly, the first optical component group 10A on the rail bench 52 is movable relative to the second optical component group 10B.

The second optical component group 10B includes a fixing jig 24 and a rotary holder 34 in addition to the optical elements 13 and 14, the polarization control element 22, and the light modulator 32. The fixing jig 24 is a jig for fixing the polarization control element 22, includes a concave portion into which the polarization control element 22 is inserted, and is disposed between the optical element 13 and the rotary holder 34. The rotary holder 34 supports the light modulator 32 and allows the light modulator 32 to be rotatable about an optical axis. The rotary holder 34 is disposed in the positive direction of the Y-axis vector relative to the optical element 13. The second optical component group 10B is mounted on a spacer 62 having a flat surface. Among these, the optical elements 13 and 14 are mounted on the spacer 62 with a spacer 19 (see FIG. 12) interposed therebetween for the purpose of height adjustment. The spacer 62 is fixed onto the breadboard 61 and is disposed in the positive direction of the Y-axis vector relative to the rail 51.

The rail 51 and the rail bench 52 have only to be a linear rail and may be, for example, an automatic stage. The second optical component group 10B may be mounted on a rail and a rail bench having the same configurations as the rail 51 and the rail bench 52 instead of the spacer 62. In this case, the first optical component group 10A may be mounted on a spacer instead of the rail 51 and the rail bench 52.

Figure 15A:
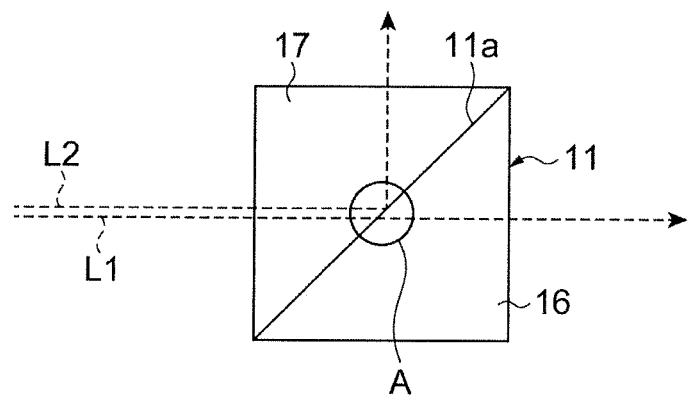
FIG. 15A is a plan view illustrating a specific example of a configuration of the first and fourth optical elements.
Figure 15B:
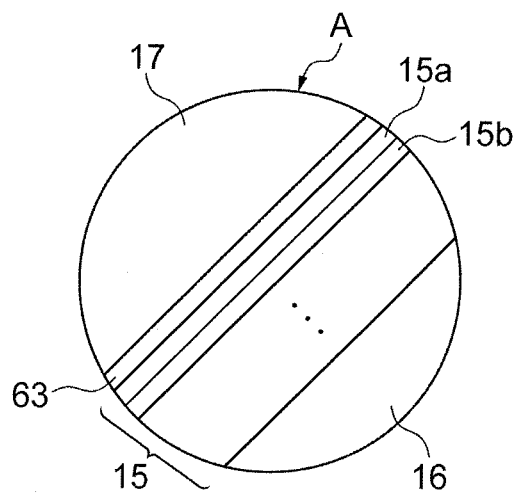
FIG. 15B is a partially enlarged view illustrating a specific example of a configuration of the first and fourth optical elements.

FIG. 15A is a plan view illustrating a specific example of a configuration of the optical element 11. FIG. 15B is a partially enlarged view of Part A in FIG. 15A. The specific configuration of the optical element 14 is the same as the optical element 11.

As illustrated in FIG. 15A, the optical element 11 includes prisms 16 and 17 having a triangular pole shape. The prisms 16 and 17 are unified as a body by bonding flanks thereof to each other. A bonding surface thereof functions as the wavelength selection surface 11a. That is, as illustrated in FIG. 15B, a dielectric multilayer film 15 in which dielectric films 15a and 15b are alternately stacked is formed on the flank of the prism 16 by vapor deposition. The dielectric film 15a is, for example, a $TiO_2$ film and the dielectric film 15b is, for example, a $SiO_2$ film. The outermost surface of the dielectric multilayer film 15 is bonded to the flank of the prism 17 with an adhesive layer 63 interposed therebetween. An acrylic transparent adhesive having about the same refractive index (1.48) as quartz glass is used in the adhesive layer 63. The function of the wavelength selection surface 11a is properly realized by the dielectric multilayer film 15.

Figure 16A:
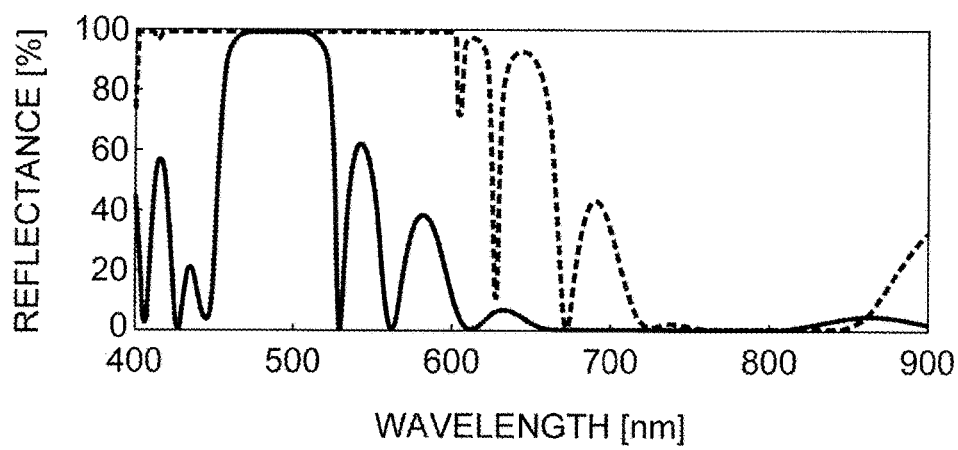
FIG. 16A is a graph illustrating an example of wavelength selectivity of a dielectric multilayer film and illustrating characteristics of a long-pass filter.
Figure 16B:
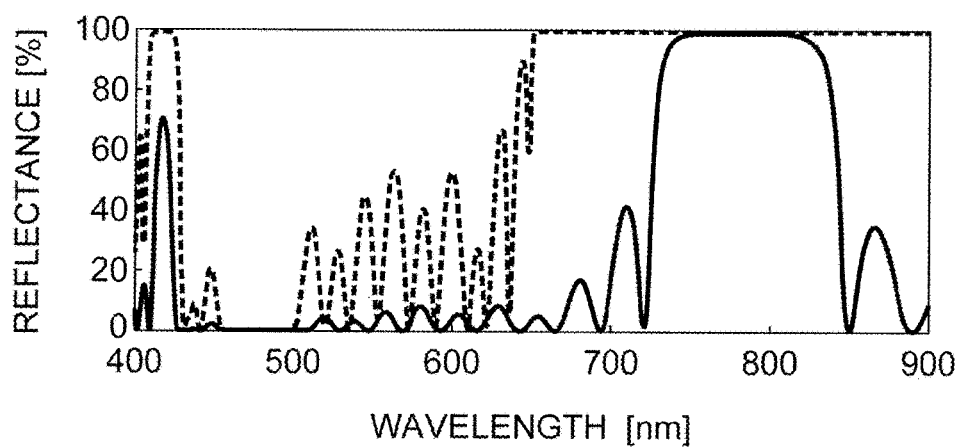
FIG. 16B is a graph illustrating an example of wavelength selectivity of a dielectric multilayer film and illustrating characteristics of a short-pass filter.

FIG. 16A is a graph illustrating an example of wavelength selectivity of the dielectric multilayer film 15 and illustrating characteristics of a long-pass filter. FIG. 16B is a graph illustrating an example of wavelength selectivity of the dielectric multilayer film 15 and illustrating characteristics of a short-pass filter. In the drawings, a solid line represents reflectance for p-polarized light and a dotted line represents reflectance for s-polarized light. For example, by these characteristics, the wavelength selection surfaces 11a and 14a that transmit (or reflect) the beam L1 which is red light with a wavelength of 780 nm and reflect (transmit) the beam L2 which is blue light with a wavelength of 480 nm can be properly realized. In an example, the dielectric multilayer film 15 transmits (or reflects) light in a range of 780 nm±50 nm and reflects (or transmits) light in a range of 480 nm±50 nm.

Figure 17A:
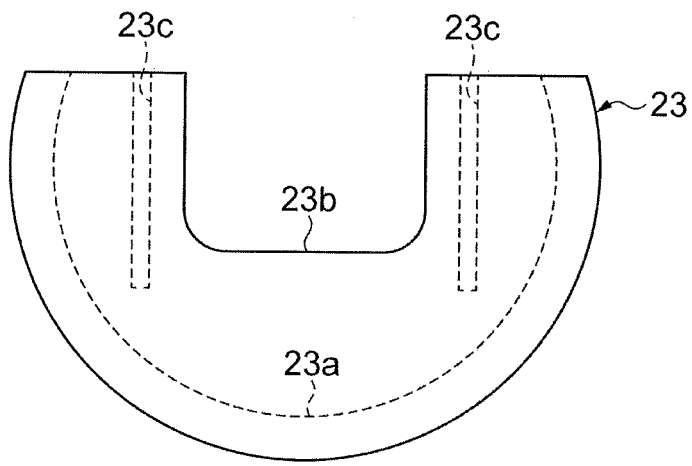
FIG. 17A is a front view illustrating a configuration of a fixing jig.
Figure 17B:
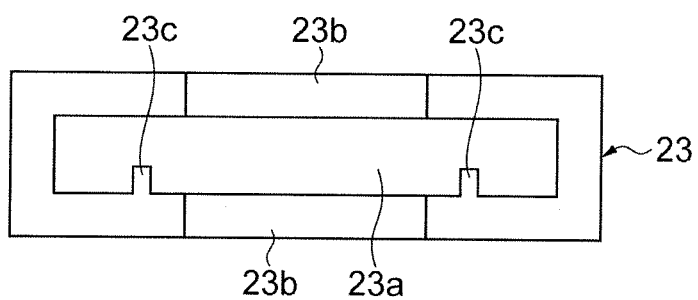
FIG. 17B is a top view illustrating a configuration of a fixing jig.

FIG. 17A is a front view illustrating a configuration of the fixing jig 23. FIG. 17B is a top view illustrating a configuration of the fixing jig 23. The configuration of the fixing jig 24 is the same as the fixing jig 23.

The fixing jig 23 has a substantially semi-circular side shape and includes a concave portion 23a having a semi-circular cross-section therein. The concave portion 23*a* receives the polarization control element 21. In order to expose the light-transmitting area of the polarization control element 21, a cutout portion 23*b* extending downward from the center of an opening is formed in the front wall and the rear wall of the concave portion 23*a*. A pair of protrusions 23*c* for guiding the polarization control element 21 is disposed inside the front wall and the rear wall of the concave portion 23*a*. The pair of protrusions 23*c* is disposed such that the length direction is parallel to the up-down direction of the fixing jig 23 (that is, a normal direction of the surface of the breadboard 61).

Figure 18A:
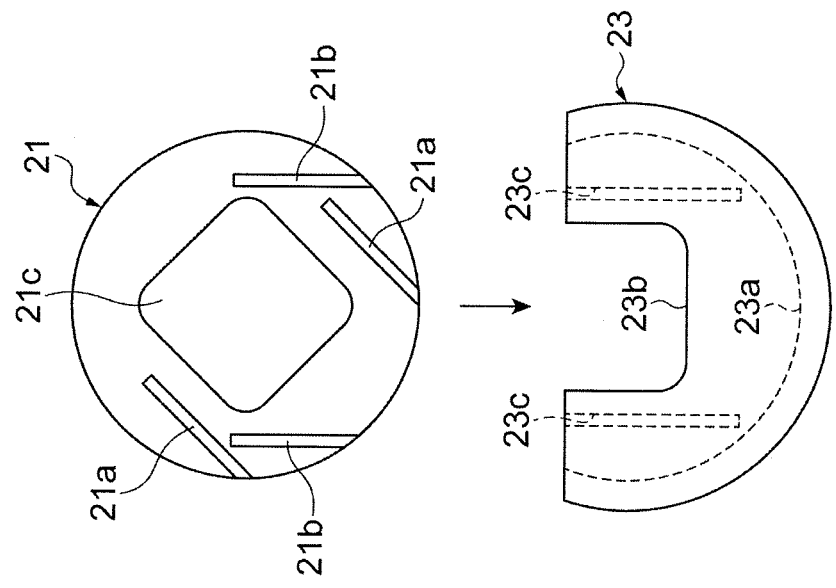
FIG. 18A is a diagram illustrating a state in which a polarization control element is inserted into a concave portion of the fixing jig.
Figure 18B:
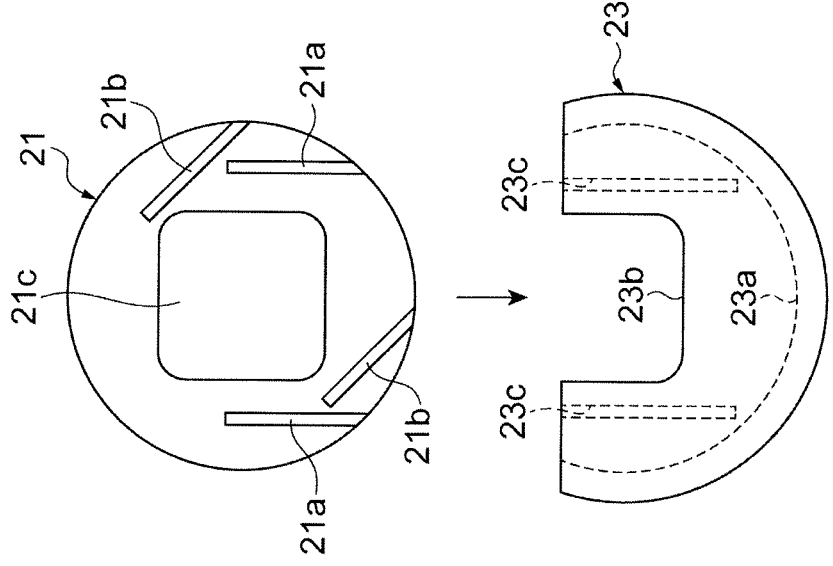
FIG. 18B is a diagram illustrating a state in which a polarization control element is inserted into a concave portion of the fixing jig.

FIGS. 18A and 18B illustrate a state in which the polarization control element 21 is inserted into the concave portion 23*a* of the fixing jig 23. As illustrated in the drawings, the polarization control element 21 includes a pair of grooves 21*a* for receiving the pair of protrusions 23*c* and another pair of grooves 21*b* for receiving the pair of protrusions 23*c* around the light-transmitting area 21*c*. The length direction of the groove 21*a* and the length direction of the groove 21*b* form a predetermined angle (for example, 45°). In a certain modulation mode, as illustrated in FIG. 18A, the polarization control element 21 is inserted into the fixing jig 23 at an angle at which the pair of protrusions 23*c* is received in the pair of grooves 21*a*. In another modulation mode, as illustrated in FIG. 18B, the polarization control element 21 is inserted into the fixing jig 23 at an angle at which the pair of protrusions 23*c* is received in the pair of grooves 21*b*. In this way, the pair of protrusions 23*c*, the pair of grooves 21*a*, and the pair of grooves 21*b* are a mechanism for allowing the polarization control element 21 to rotate about an optical axis.

Figure 19A:
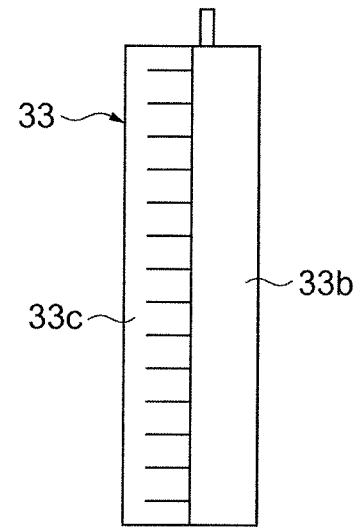
FIG. 19A is a side view illustrating a configuration of a rotary holder.
Figure 19B:
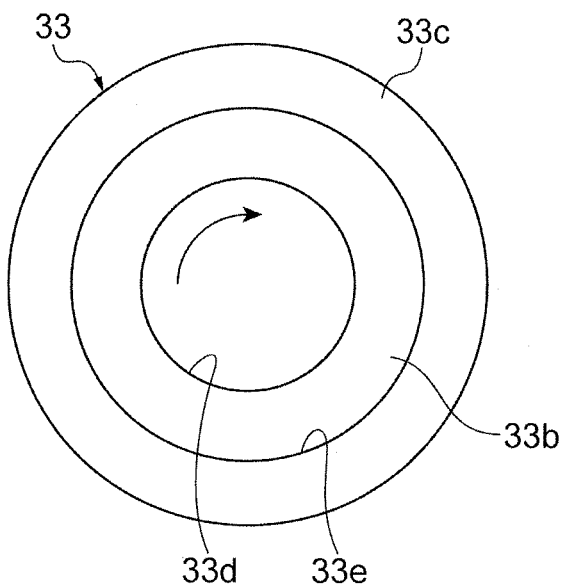
FIG. 19B is a front view illustrating a configuration of a rotary holder.

FIGS. 19A and 19B are diagrams illustrating a configuration of the rotary holder 33. FIG. 19A is a side view of the rotary holder 33 and FIG. 19B is a front view of the rotary holder 33. The configuration of the rotary holder 34 is the same as the rotary holder 33.

The rotary holder 33 includes a rotary portion 33*b* having a substantially annular shape and a fixed portion 33*c* having a substantially annular shape. The rotary portion 33*b* and the fixed portion 33*c* are arranged in a direction in which an axis direction thereof is parallel to an optical axis direction and are arranged in the optical axis direction. The rotary portion 33*b* is rotatable about the axis relative to the fixed portion 33*c*. The rotary portion 33*b* and the fixed portion 33*c* have openings 33*d* and 33*e* which are concentric and light passes through the insides of the opening 33*d* and 33*e*. The light modulator 31 is fixed to the rotary portion 33*b* such that the modulation surface is exposed to the opening 33*d* of the rotary portion 33*b*. That is, the rotary holder 33 is a mechanism allowing the light modulator 31 to rotate about the optical axis.

Advantages achieved by the optical module 1A according to the above-mentioned embodiment will be described below along with problems in the related art. As described above, in a light irradiation device, various types of irradiation light can be realized, for example, by combining various optical elements such as a wavelength selecting filter or a polarization splitting element and a plurality of light modulators. However, for this purpose, it is necessary to carry out operations of appropriately selecting optical elements depending on a desired modulation mode and constructing an optical system (that is, designing a necessary optical path to precisely arrange the optical elements and the light modulators). When it is intended to change a modulation mode, it is necessary to construct an optical path again. On the other hand, according to the optical module 1A according to this embodiment, a desired type among several types of optical paths can be easily selected by changing the relative positional relationship of the optical elements 11 and 12 and the optical elements 13 and 14 using the sliding mechanism 50 as illustrated in FIGS. 2 to 4. Accordingly, since various modulation modes can be simply realized, an operator not having a skill for constructing an optical path can easily achieve a desired modulation mode.

According to the optical module 1A according to this embodiment, in a light irradiation device such as a laser processing device, it is possible to provide various modulation modes in which different light condensing heights at the same position are irradiated with a beam or an irradiation object is simultaneously irradiated with a plurality of beams having different irradiation conditions such as pulse width or repetition frequency.

As described in this embodiment, at least one of the wavelength selection surfaces 11*a* and 14*a* may be a wavelength selecting filter or a dichroic mirror. Accordingly, it is possible to properly realize the wavelength selection surface 11*a* that transmits the beam L1 and reflects the beam L2 (or reflects the beam L1 and transmits the beam L2) and/or the wavelength selection surface 14*a* that reflects one of the beams L1 and L2 and transmits the other.

As described in this embodiment, at least one of the optical elements 12 and 13 may be a polarization beam splitter or a half mirror. Accordingly, it is possible to properly realize the optical elements 12 and 13 that transmits at least a part of incident light to the polarization control element 21 (22) and reflects at least a part of light returned from the light modulator 31 (32) via the polarization control element 21 (22). Particularly, the polarization beam splitter can suppress optical loss.

As described in this embodiment, the optical module 1A may include at least one of the shading portion 41 that is disposed in the negative direction of the Y-axis vector relative to the optical element 12 and the shading portion 42 that is disposed in the negative direction of the X-axis vector relative to the optical element 13. Since the optical module 1A includes the shading portion 41, it is possible to reduce stray light that is output in the negative direction of the Y-axis vector from the optical element 12 and light that is returned to the reflection surface 12*a* without being modulated. Since the optical module 1A includes the shading portion 42, it is possible to reduce stray light that is output in the negative direction of the X-axis vector from the optical element 13 and light that is returned to the reflection surface 13*a* without being modulated.

As described in this embodiment, at least one of the polarization control elements 21 and 22 may be any one of a polarizing plate, a wavelength plate, a Faraday rotator, and a variable polarization rotator. Accordingly, it is possible to control the polarization states of the beams L1 and L2 in various forms and to realize various modulation modes.

As described in this embodiment, the polarization control elements 21 and 22 may be detachable from the fixing jigs 23 and 24. Accordingly, a mode including the polarization control elements 21 and 22 and a mode not including the polarization control elements can be easily switched to each other and it is possible to realize more various modulation modes.

As described in this embodiment, the optical module 1A may include the mechanism (the grooves 21*a* and 21*b* and the protrusions 23*c*) that allows the polarization control elements 21 and 22 to rotatable about the optical axis. Accordingly, it is possible to easily set the polarization control elements 21 and 22 to various angles about the polarization direction of the initial beams L1 and L2 and to realize more various modulation modes.

As described in this embodiment, at least one of the light modulators 31 and 32 may be an SLM or an EO modulator. Accordingly, it is possible to construct the light modulators 31 and 32 with a smaller size and to decrease the size of the optical module 1A as a whole.

As described in this embodiment, the optical module 1A may include a mechanism (the rotary holders 33 and 34) that allows the light modulators 31 and 32 to rotate about the optical axis. Accordingly, it is possible to easily set the light modulators 31 and 32 to various angles about the polarization direction of the initial beams L1 and L2 and to realize more various modulation modes.

First Modified Example

Figure 20:
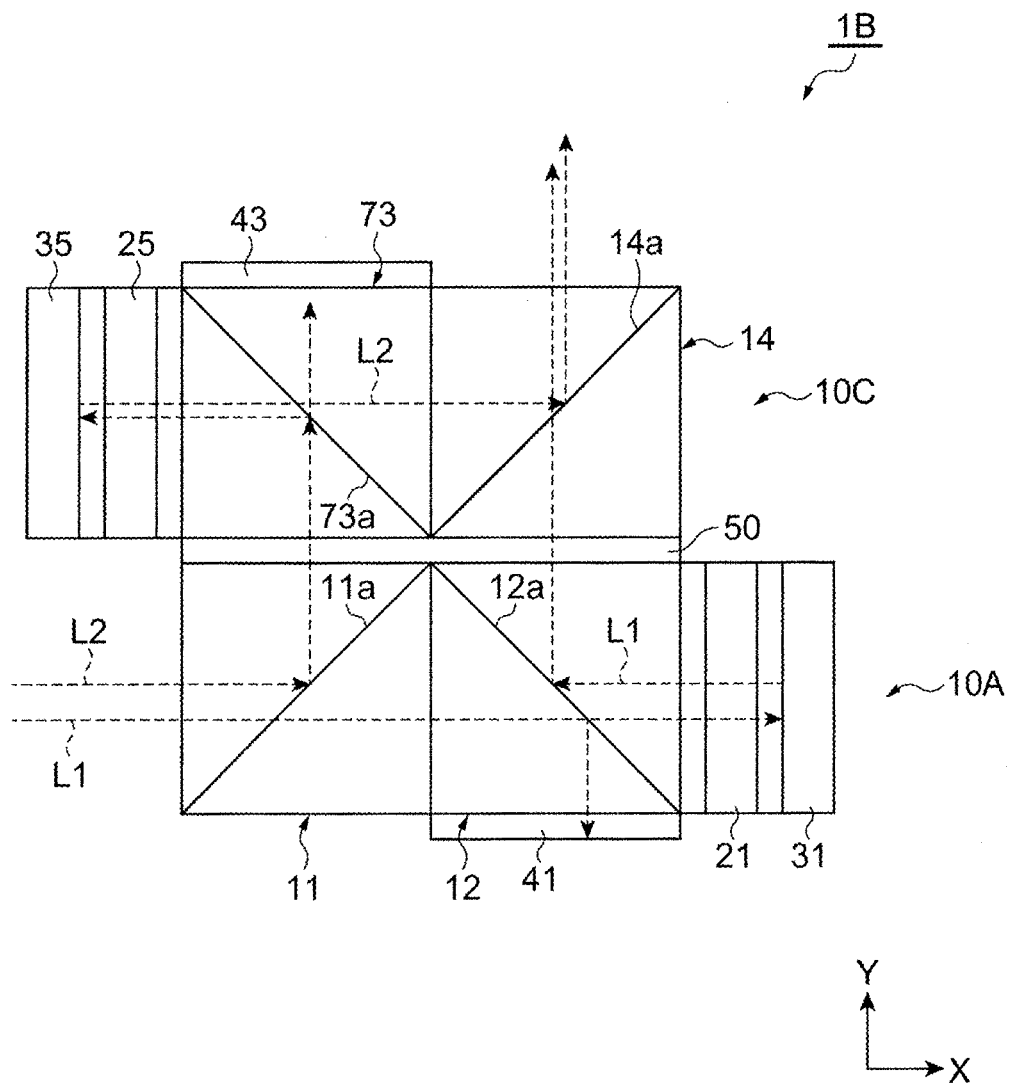
FIG. 20 is a plan view illustrating a configuration of an optical module according to a first modified example and illustrating the first mode.
Figure 21:
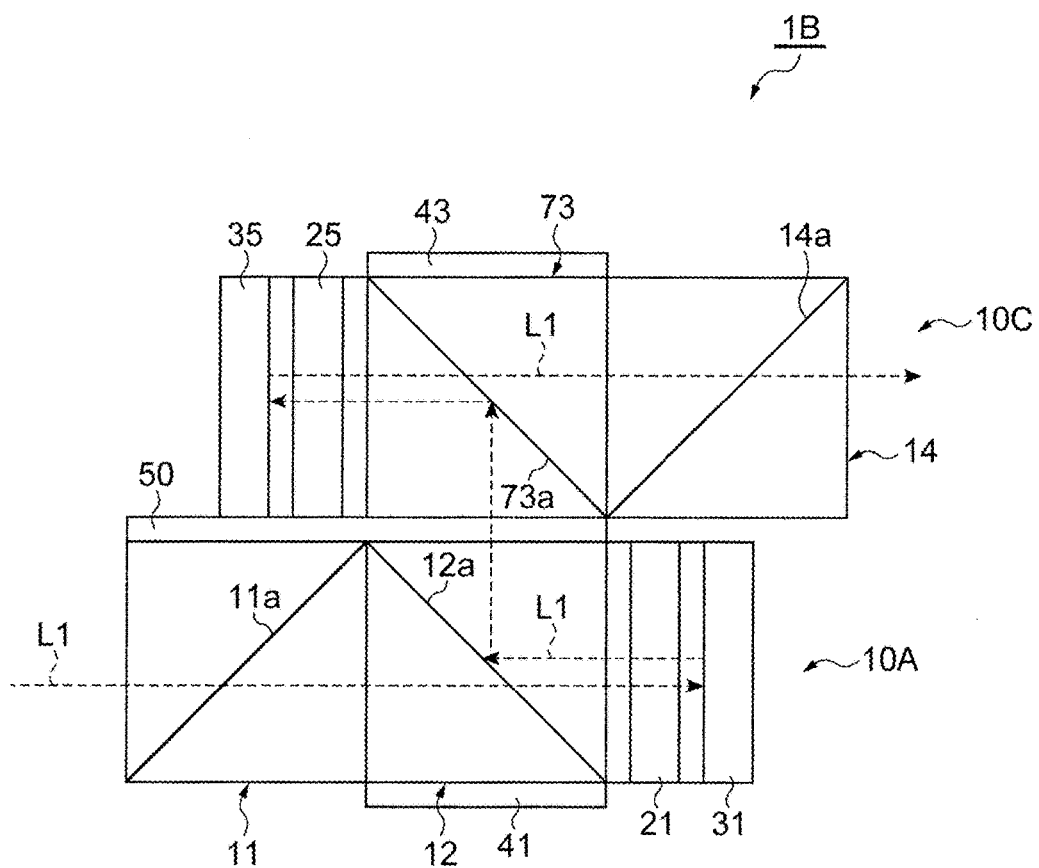
FIG. 21 is a plan view illustrating a configuration of the optical module according to the first modified example and illustrating the second mode.
Figure 22:
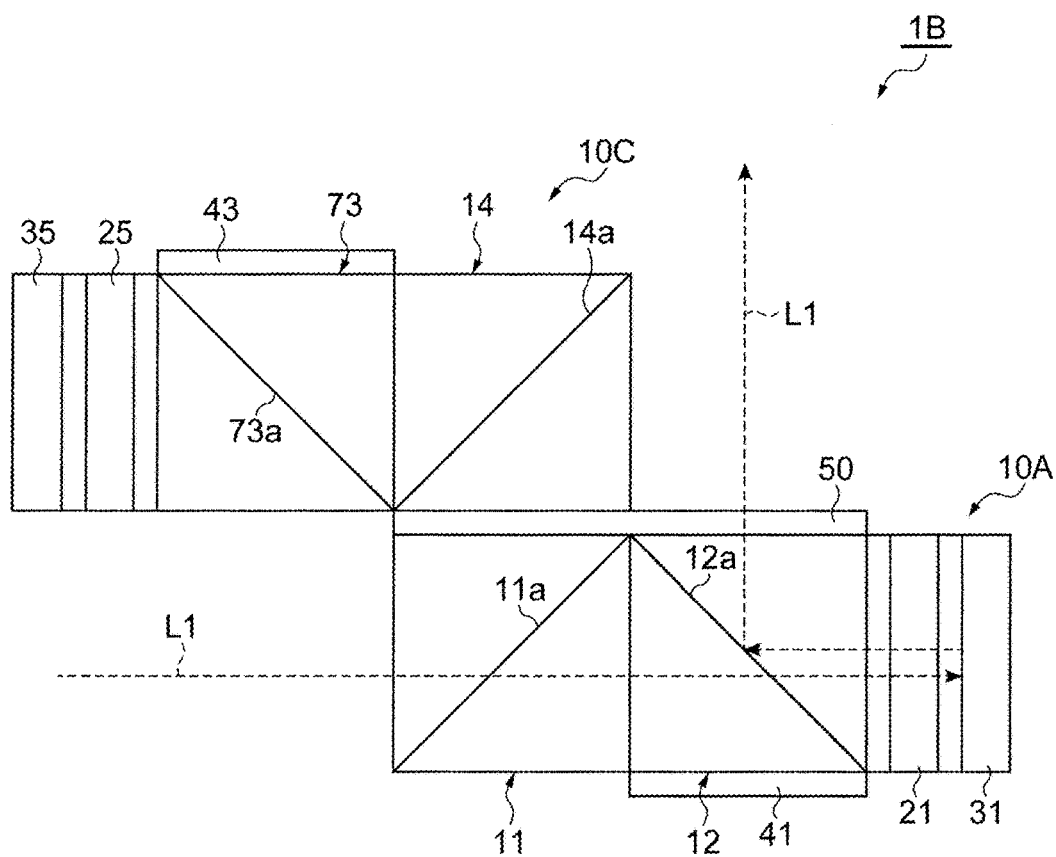
FIG. 22 is a plan view illustrating a configuration of the optical module according to the first modified example and illustrating the third mode.

FIGS. 20 to 22 are plan views illustrating a configuration of an optical module 1B according to a first modified example of the above-mentioned embodiment. FIG. 20 illustrates a first mode, FIG. 21 illustrates a second mode, and FIG. 22 illustrates a third mode. The same advantages as in the above-mentioned embodiment can be achieved even with the configurations according to this modified example.

The optical module 1B is different from the optical module according to the above-mentioned embodiment, in configuration of a third optical element and arrangement of a second polarization control element, a second reflective light modulator, and a second shading portion. That is, in the optical module 1B, a second optical component group 10C includes an optical element (the third optical element) 73, a polarization control element (the second polarization control element) 25, a light modulator (the second reflective light modulator) 35, and a shading portion (the second shading portion) 43 instead of the optical element 13, the polarization control element 22, the light modulator 32, and the shading portion 42 in the first embodiment. The configuration of the second optical component group 10C other than this configuration is the same as the second optical component group 10B in the first embodiment.

The optical element 73 is a cubic prism and includes a reflection surface 73a. The optical element 73 reflects at least a part of a beam incident in the positive direction of the Y-axis vector to the polarization control element 25 and transmits at least a part of a beam returned from the light modulator 35 via the polarization control element 25 in the positive direction of the X-axis vector. The optical element 73 is, for example, a polarization beam splitter or a half mirror. The other configuration of the optical element 73 is the same as the above-mentioned optical element 13.

The polarization control element 25 and the light modulator 35 are sequentially arranged in the negative direction of the X-axis vector from the optical element 73. The polarization control element 25 is one of a polarizing plate (a polarizer), a wavelength plate, a Faraday rotator, and a variable polarization rotator. The polarization control element 25 is detachable and can be detached from between the optical element 73 and the light modulator 32 by the same configuration as the polarization control element 22. The polarization control element 25 is rotatable about an optical axis, for example, by the mechanism illustrated in FIGS. 18A and 18B. The light modulator 35 is of a reflection type and is, for example, an SLM or an EO modulator. The light modulator 35 is rotatable about an optical axis, for example, by the mechanism illustrated in FIGS. 19A and 19B.

The shading portion 43 is disposed in the positive direction of the Y-axis vector relative to the optical element 73 and is optically coupled to the optical element 73. The shading portion 43 absorbs light that is transmitted by the reflection surface 73a of the optical element 73 and travels in the positive direction of the Y-axis vector.

Second Modified Example

Figure 23:
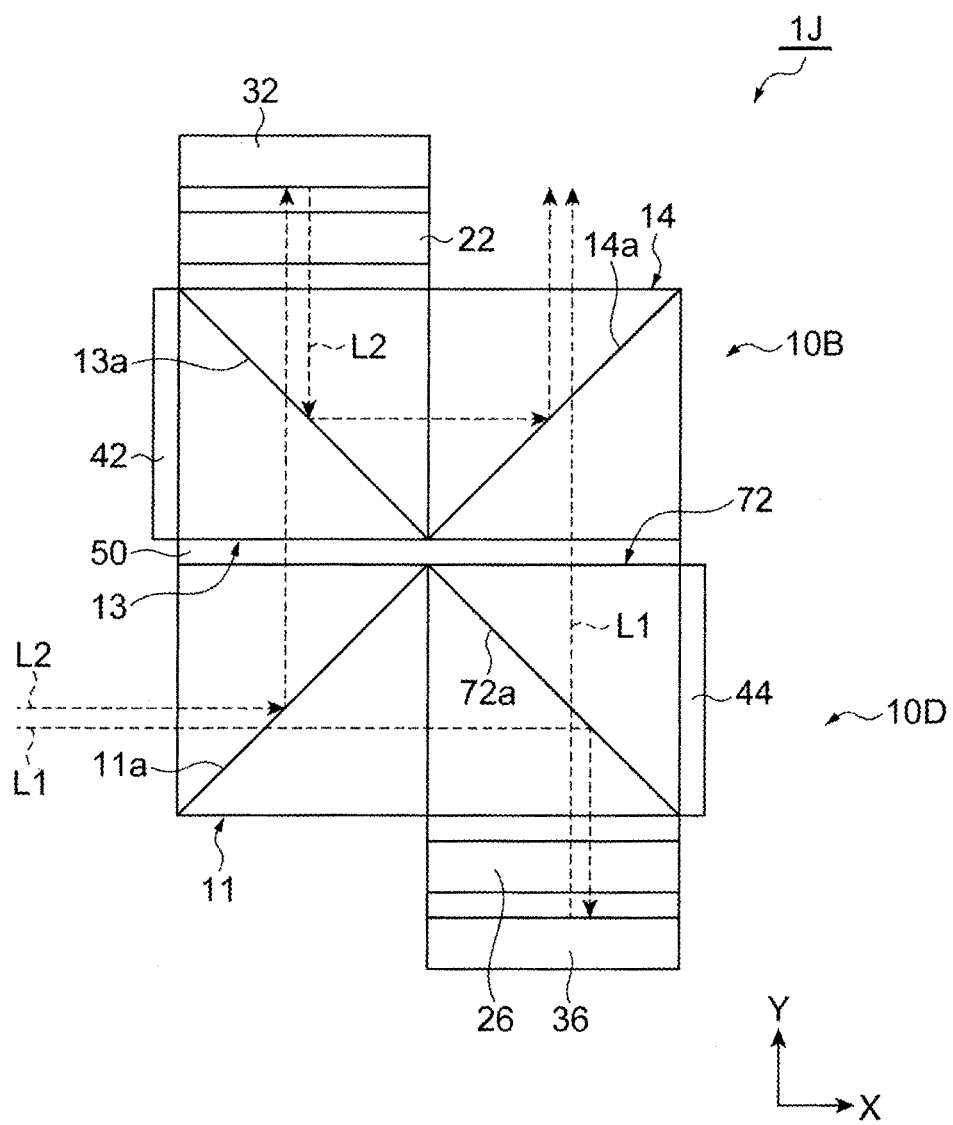
FIG. 23 is a plan view illustrating a configuration of an optical module according to a second modified example and illustrating the first mode.
Figure 24:
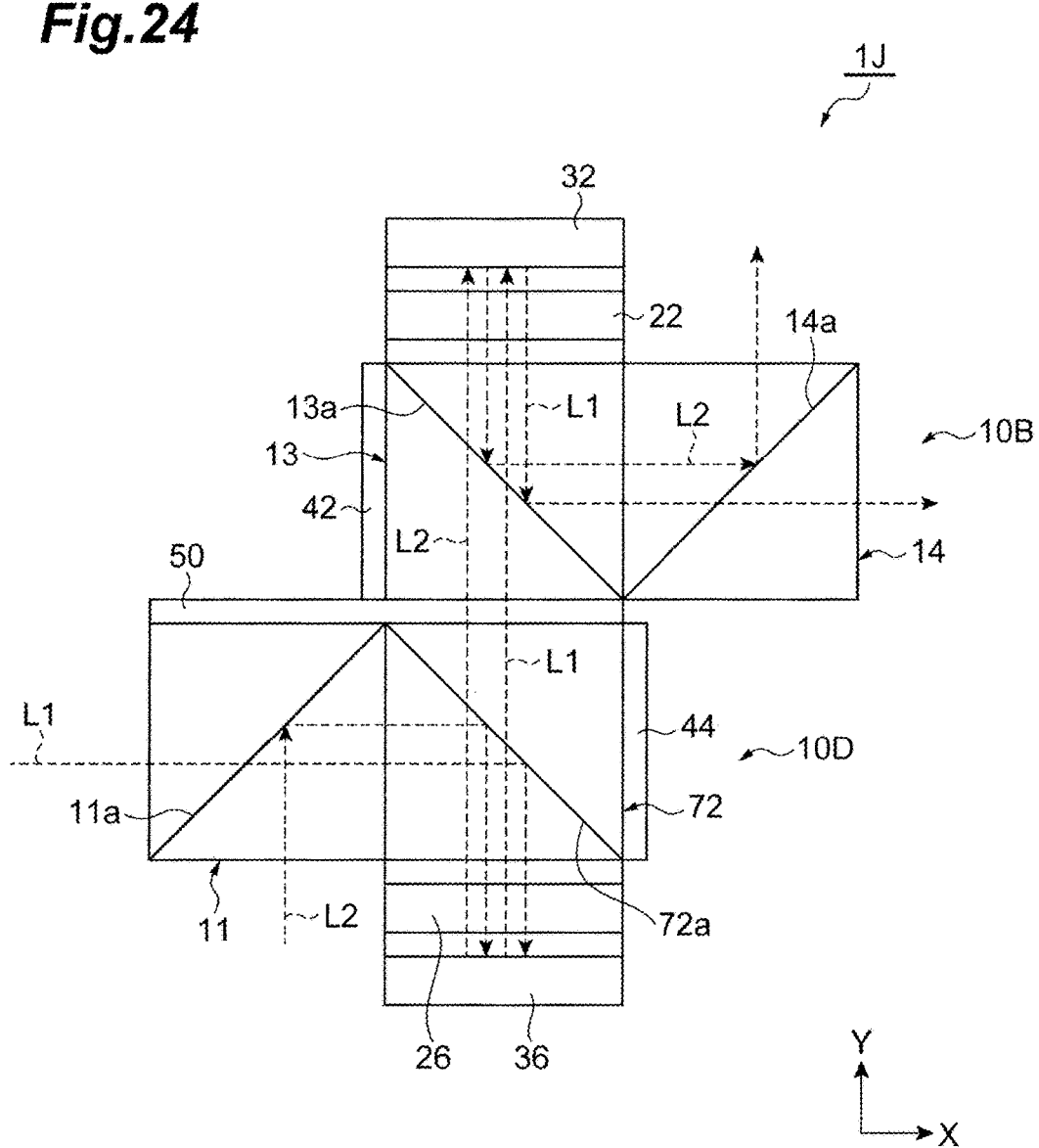
FIG. 24 is a plan view illustrating a configuration of the optical module according to the second modified example and illustrating the second mode.
Figure 25:
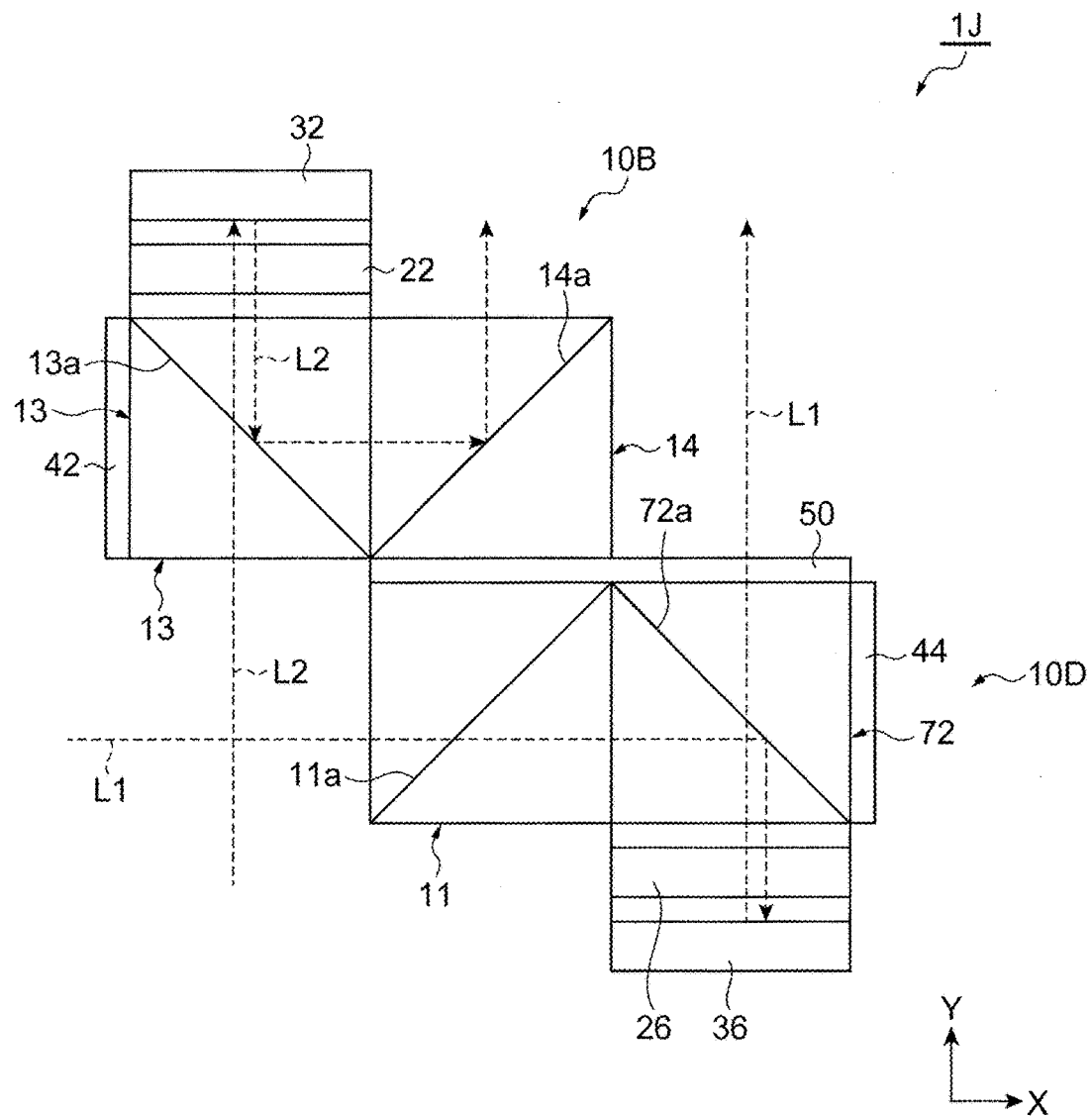
FIG. 25 is a plan view illustrating a configuration of the optical module according to the second modified example and illustrating the third mode.

FIGS. 23 to 25 are plan views illustrating a configuration of an optical module 1J according to a second modified example of the above-mentioned embodiment. FIG. 23 illustrates a first mode, FIG. 24 illustrates a second mode, and FIG. 25 illustrates a third mode. The same advantages as in the above-mentioned embodiment can be achieved even with the configurations according to this modified example.

The optical module 1J is different from the optical module according to the above-mentioned embodiment, in configuration of a second optical element and arrangement of a first polarization control element, a first reflective light modulator, and a first shading portion. That is, in the optical module 1J, a first optical component group 10D includes an optical element (the second optical element) 72, a polarization control element (the first polarization control element) 26, a light modulator (the first reflective light modulator) 36, and a shading portion (the first shading portion) 44 instead of the optical element 12, the polarization control element 21, the light modulator 31, and the shading portion 41 in the first embodiment. The configuration of the first optical component group 10D other than this configuration is the same as the first optical component group 10A in the first embodiment.

The optical element 72 is a cubic prism and includes a reflection surface 72a. The optical element 72 reflects at least a part of a beam incident in the positive direction of the X-axis vector to the polarization control element 26 and transmits at least a part of a beam returned from the light modulator 36 via the polarization control element 26 in the positive direction of the Y-axis vector. The optical element 72 is, for example, a polarization beam splitter or a half mirror. The other configuration of the optical element 72 is the same as the above-mentioned optical element 12.

The polarization control element 26 and the light modulator 36 are sequentially arranged in the negative direction of the Y-axis vector from the optical element 72. The polarization control element 26 is one of a polarizing plate (a polarizer), a wavelength plate, a Faraday rotator, and a variable polarization rotator. The polarization control element 26 is detachable and can be detached from between the optical element 72 and the light modulator 36 by the same configuration as the polarization control element 21. The polarization control element 26 is rotatable about an optical axis, for example, by the mechanism illustrated in FIGS. 18A and 18B. The light modulator 36 is of a reflection type and is, for example, an SLM or an EO modulator. The light modulator 36 is rotatable about an optical axis, for example, by the mechanism illustrated in FIGS. 19A and 19B.

The shading portion 44 is disposed in the positive direction of the X-axis vector relative to the optical element 72 and is optically coupled to the optical element 74. The shading portion 44 absorbs light that is transmitted by the reflection surface 72a of the optical element 72 and travels in the positive direction of the X-axis vector.

Second Embodiment

Subsequently, an extension structure that is disposed around the optical module 1A according to a second embodiment will be described below. A plurality of functions of the optical module 1A can be simply used and an incidence direction and an exit direction of a beam may not be coaxial with each other by switching of an optical path with a change in mode. In order to solve this problem, the incidence direction and the exit direction of a beam can be made to be coaxial, for example, by properly arranging a plurality of mirrors and spectroscopic elements. For example, when modulation frequencies of the beams L1 and L2 are defined as A and B (where A and B are integers equal to or greater than 0), the patterns of the extension structure are classified into five types as expressed by Equation (1).

$$md(A,B)=\{m(1,1),md(1,0),md(0,1),md(2,0),md(0,2)\} \quad \text{Equation (1)}$$

Figure 26A:
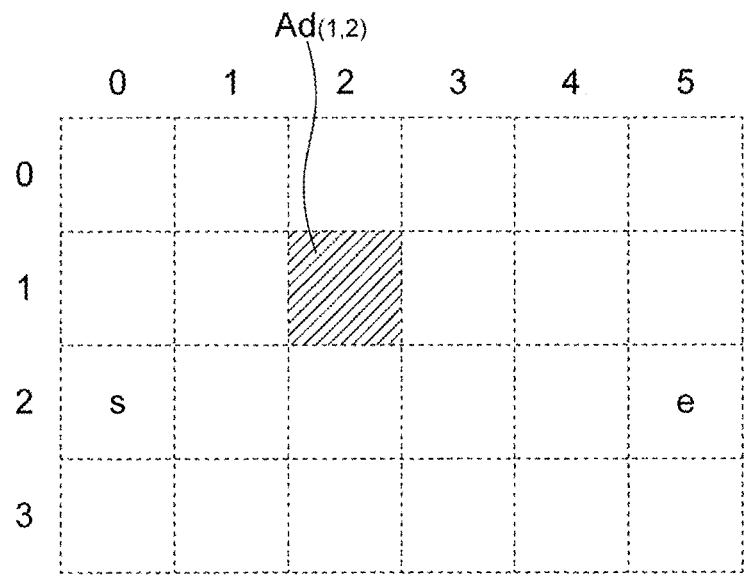
FIG. 26A is a diagram illustrating a matrix of four rows and six columns in an extension structure.

The functions can be extended with respect to arbitrary values of A and B by optical coupling selectively using the five patterns of the extension structure. As illustrated in FIG. 26A, a matrix of four rows and six columns is now assumed. It is assumed that the row direction is parallel to the X-axis vector illustrated in FIG. 1 and the column direction is parallel to the Y-axis vector. A position of the m-th row and n-th column (where m and n are integers equal to or greater than 0) in the matrix is defined by Ad(m, n). For example, the position of the first row and the second column Ad(1, 2) is illustrated in the drawing. In the following description, an incidence port(s) of beams L1 and L2 is set to Ad(2, 0) and an exit port (e) is set to Ad(2, 5). The positions of the incidence port (s) and the exit port (e) are arbitrary.

Figure 26B:
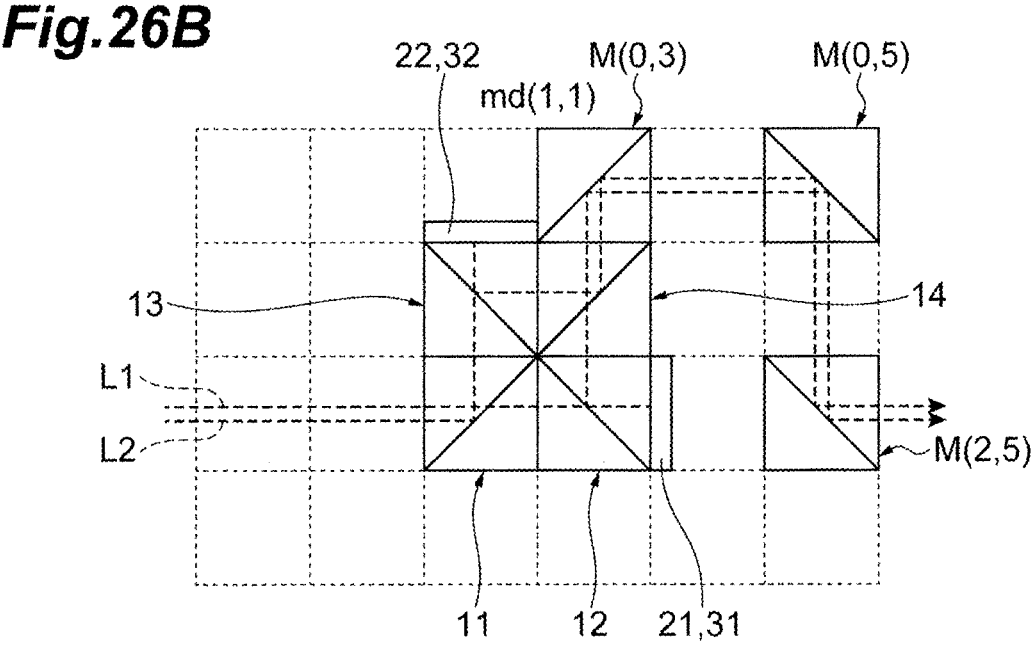
FIG. 26B is a diagram illustrating an example of an extension structure.

FIG. 26B is a diagram illustrating an extension mode md(1, 1) which is an example of the extension structure. In this structure, the optical element 11 is disposed at Ad(2, 2), the optical element 12 is disposed at Ad(2, 3), the optical element 13 is disposed at Ad(1, 2), and the optical element 14 is disposed at Ad(1, 3). That is, the optical elements 11 to 14 constitute the first mode. Total reflection mirrors M(0, 3), M(0, 5), and M(2, 5) are disposed at Ad(0, 3), Ad(0, 5), and Ad(2, 5).

In this structure, beams L1 and L2 are incident on the optical element 11 in the row direction from Ad(2, 0). The beams L1 and L2 are modulated and then exit from the optical element 14 to the mirror M(0, 3) in the column direction. The optical paths of the beams L1 and L2 in the optical elements 11 to 14 are the same as illustrated in FIG. 2. The mirror M(0, 3) directs the beams L1 and L2 to the mirror M(0, 5). The mirror M(0, 5) directs the beams L1 and L2 to the mirror M(2, 5). The mirror M(2, 5) changes the direction of the beams L1 and L2 and causes the beams to exit in the row direction. By this structure, the beams L1 and L2 input from the incidence port (s) can be modulated and exit from the exit port (e) in the first mode.

Figure 27A:
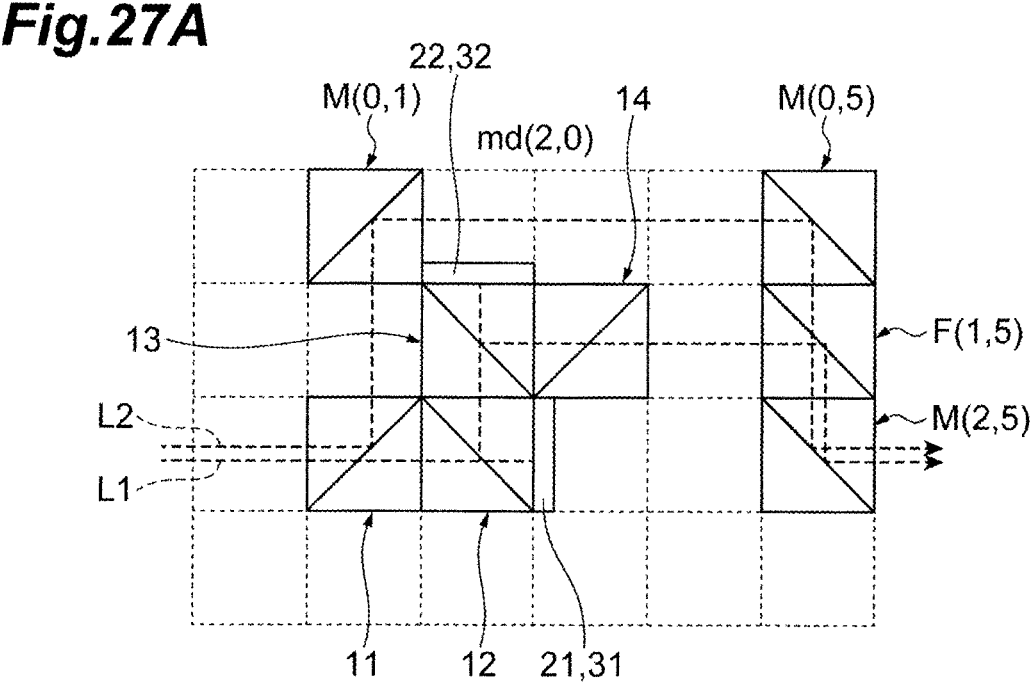
FIG. 27A is a diagram illustrating an example of an extension structure.

FIG. 27A is a diagram illustrating an extension mode md(2, 0) which is another example of the extension structure. In this structure, the optical element 11 is disposed at Ad(2, 1), the optical element 12 is disposed at Ad(2, 2), the optical element 13 is disposed at Ad(1, 2), and the optical element 14 is disposed at Ad(1, 3). That is, the optical elements 11 to 14 constitute the second mode. Total reflection mirrors M(0, 3), M(0, 5), and M(2, 5) are disposed at Ad(0, 1), Ad(0, 5), and Ad(2, 5), and the wavelength selecting filter F(1, 5) is disposed at Ad(1, 5). The wavelength selecting filter F(1, 5) reflects the wavelength of the beam L1 and transmits the wavelength of the beam L2.

In this structure, beams L1 and L2 are coaxially incident on the optical element 11 in the row direction from Ad(2, 0). The beam L1 passes through the optical elements 11 to 14 and is modulated by the light modulators 31 and 32. Thereafter, the beam L1 is output from the optical element 14 to the wavelength selecting filter F(1, 5) in the row direction. The wavelength selecting filter F(1, 5) directs the beam L1 to the mirror M(2, 5). The beam L2 is not modulated and is output from the optical element 11 to the mirror M(0, 1) in the column direction. The mirror M(0, 1) directs the beam L2 to the mirror M(0, 5). The mirror M(0, 5) directs the beam L2 to the mirror M(2, 5). The beam L2 is transmitted by the wavelength selecting filter F(1, 5). Accordingly, the optical paths of the beams L1 and L2 become coaxial again. The mirror M(2, 5) changes the direction of the beams L1 and L2 and outputs the beams. By this structure, the beams L1 and L2 coaxially input from the incidence port (s) can be modulated two times, be made to be coaxial again, and be made to exit from the exit port (e) in the second mode.

Figure 27B:
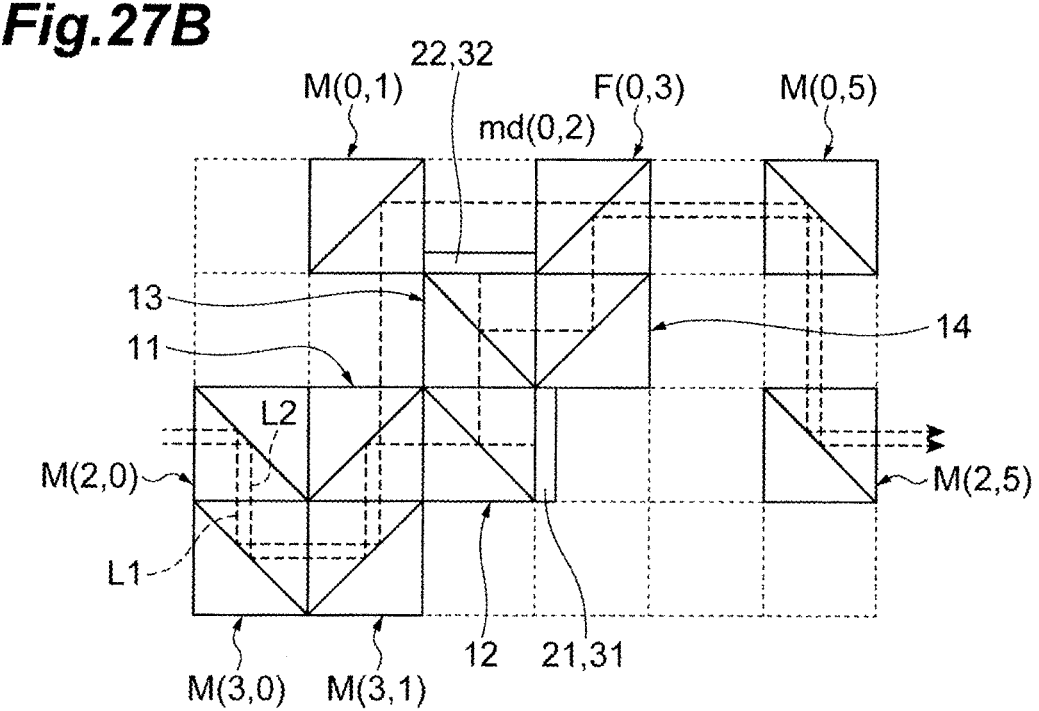
FIG. 27B is a diagram illustrating an example of an extension structure.

FIG. 27B is a diagram illustrating an extension mode md(0, 2) which is another example of the extension structure. In this structure, the optical elements 11 to 14 are arranged as illustrated in FIG. 27A and constitute the second mode. Total reflection mirrors M(0, 1), M(0, 5), M(2, 0), M(2, 5), M(3, 0), and M(3, 1) are disposed at Ad(0, 1), Ad(0, 5), Ad(2, 0), Ad(2, 5), Ad(3, 0), and Ad(3, 1) and the wavelength selecting filter F(0, 3) is disposed at Ad(0, 3). The wavelength selecting filter F(0, 3) transmits the wavelength of the beam L1 and reflects the wavelength of the beam L2.

In this structure, beams L1 and L2 are coaxially incident on the mirror M(2, 0). The mirror M(2, 0) directs the beams L1 and L2 to the mirror M(3, 0). The mirror M(3, 0) directs the beams L1 and L2 to the mirror M(3, 1). The mirror M(3, 1) directs the beams L1 and L2 to the optical element 11. Accordingly, the beams L1 and L2 can be incident on the optical element 11 in the positive direction of the Y-axis vector. The beam L1 is not modulated and is output from the optical element 11 to the mirror M(0, 1) in the column direction. The mirror M(0, 1) directs the beam L1 to the mirror M(0, 5). The beam L1 is transmitted by the wavelength selecting filter F(0, 3). On the other hand, the beam L2 passes through the optical elements 11 to 14 and is modulated by the light modulators 31 and 32. Thereafter, the beam L2 is output from the optical element 14 to the wavelength selecting filter F(0, 3) in the column direction. The wavelength selecting filter F(0, 3) directs the beam L2 to the mirror M(0, 5). Accordingly, the optical paths of the beams L1 and L2 become coaxial again. The mirror M(0, 5) directs the beams L1 and L2 to the mirror M(2, 5). The mirror M(2, 5) changes the direction of the beams L1 and L2 and outputs the beams. By this structure, only the beam L2 of the beams L1 and L2 coaxially input from the incidence port (s) can be modulated two times, and the beams can be made to be coaxial again and be made to exit from the exit port (e) in the second mode.

Figure 28A:
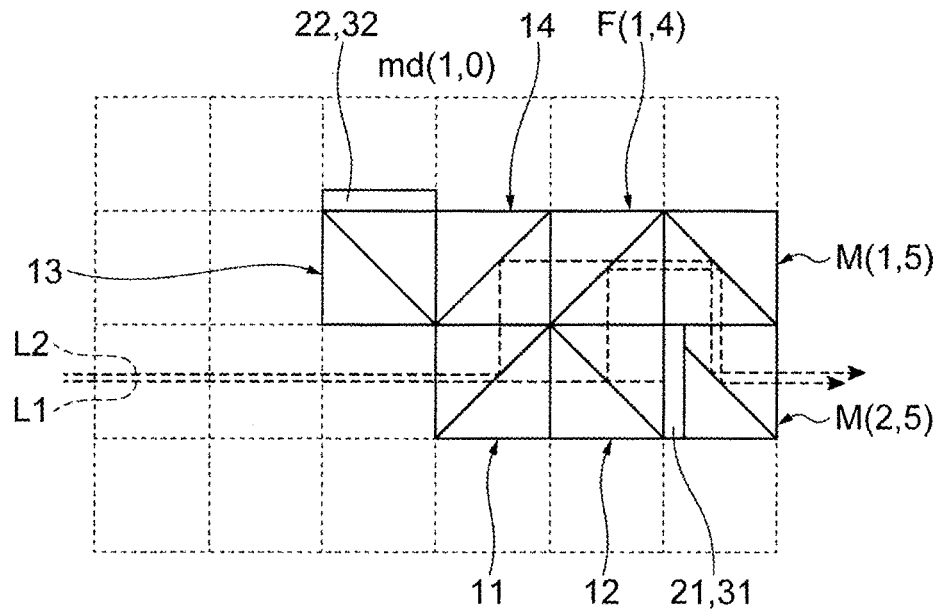
FIG. 28A is a diagram illustrating an example of an extension structure.

FIG. 28A is a diagram illustrating an extension mode md(1, 0) which is another example of the extension structure. In this structure, the optical element 11 is disposed at Ad(2, 3), the optical element 12 is disposed at Ad(2, 4), the optical element 13 is disposed at Ad(1, 2), and the optical element 14 is disposed at Ad(1, 3). That is, the optical elements 11 to 14 constitute the third mode. Total reflection mirrors M(1, 5) and M(2, 5) are disposed at Ad(1, 5) and Ad(2, 5), and the wavelength selecting filter F(1, 4) is disposed at Ad(1, 4). The wavelength selecting filter F(1, 4) reflects the wavelength of the beam L1 and transmits the wavelength of the beam L2.

In this structure, beams L1 and L2 are coaxially incident on the optical element 11 in the row direction from Ad(2, 0). The beam L1 passes through the optical elements 11 and 12 and is modulated by the light modulator 31. Thereafter, the beam L1 is output from the optical element 12 to the wavelength selecting filter F(1, 4) in the column direction. The wavelength selecting filter F(1, 4) directs the beam L1 to the mirror M(1, 5). The beam L2 is not modulated by the optical elements 11 and 14 and is output from the optical element 14 to the mirror M(1, 5) in the row direction. At this time, the beam L2 is transmitted by the wavelength selecting filter F(1, 4). Accordingly, the optical paths of the beams L1 and L2 become coaxial again. The mirror M(1, 5) directs the beams L1 and L2 to the mirror M(2, 5). The mirror M(2, 5) changes the direction of the beams L1 and L2 and outputs the beams. By this structure, only the beam L1 of the beams L1 and L2 coaxially input from the incidence port (s) can be modulated one time, and the beams can be made to be coaxial again and be made to exit from the exit port (e) in the third mode.

Figure 28B:
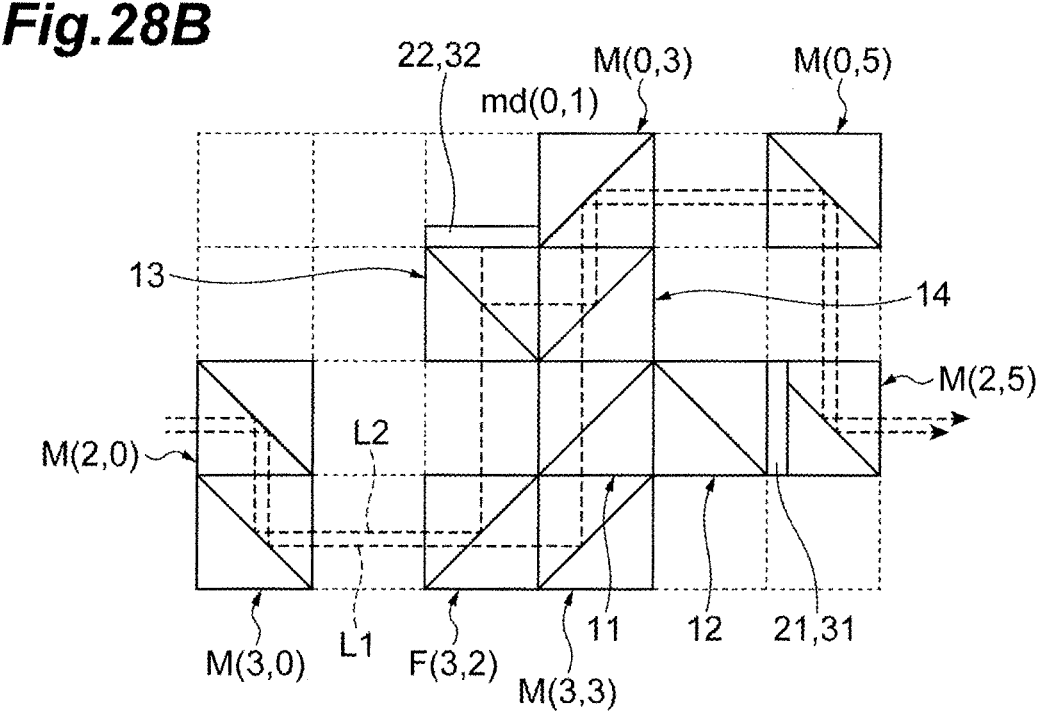
FIG. 28B is a diagram illustrating an example of an extension structure.

FIG. 28B is a diagram illustrating an extension mode md(0, 1) which is another example of the extension structure. In this structure, the optical elements 11 to 14 are disposed in the same ways as illustrated in FIG. 28A and constitute the third mode. Total reflection mirrors M(0, 3), M(0, 5), M(2, 0), M(2, 5), M(3, 0), and M(3, 3) are disposed at Ad(0, 3), Ad(0, 5), Ad(2, 0), Ad(2, 5), Ad(3, 0), and Ad(3, 3). A wavelength selecting filter F(3, 2) is disposed at Ad(3, 2). The wavelength selecting filter F(3, 2) transmits the wavelength of the beam L1 and reflects the wavelength of the beam L2.

In this structure, beams L1 and L2 are coaxially incident on the mirror M(2, 0). The mirror M(2, 0) directs the beams L1 and L2 to the mirror M(3, 0). The mirror M(3, 0) directs the beams L1 and L2 to the wavelength selecting filter F(3, 2). The wavelength selecting filter F(3, 2) transmits the beam L1 and directs the beam L2 to the optical element 13. The mirror M(3, 3) directs the beam L1 to the optical element 11. The beam L1 is incident on the optical element 11 in the column direction, but is output from the optical element 14 to the mirror M(0, 3) in the column direction without being modulated. On the other hand, the beam L2 is incident on the optical element 13 in the column direction. The beam L2 is modulated by the light modulator 32 and is then output from the optical element 14 to the mirror M(0, 3). Accordingly, the optical paths of the beams L1 and L2 become coaxial again. The mirror M(0, 3) directs the beams L1 and L2 to the mirror M(0, 5). The mirror M(0, 5) directs the beams L1 and L2 to the mirror M(2, 5). The mirror M(2, 5) changes the direction of the beams L1 and L2 and outputs the beams. By this structure, only the beam L2 of the beams L1 and L2 coaxially input from the incidence port (s) can be modulated one time, and the beams can be made to be coaxial again and be made to exit from the exit port (e) in the third mode.

Figure 29:
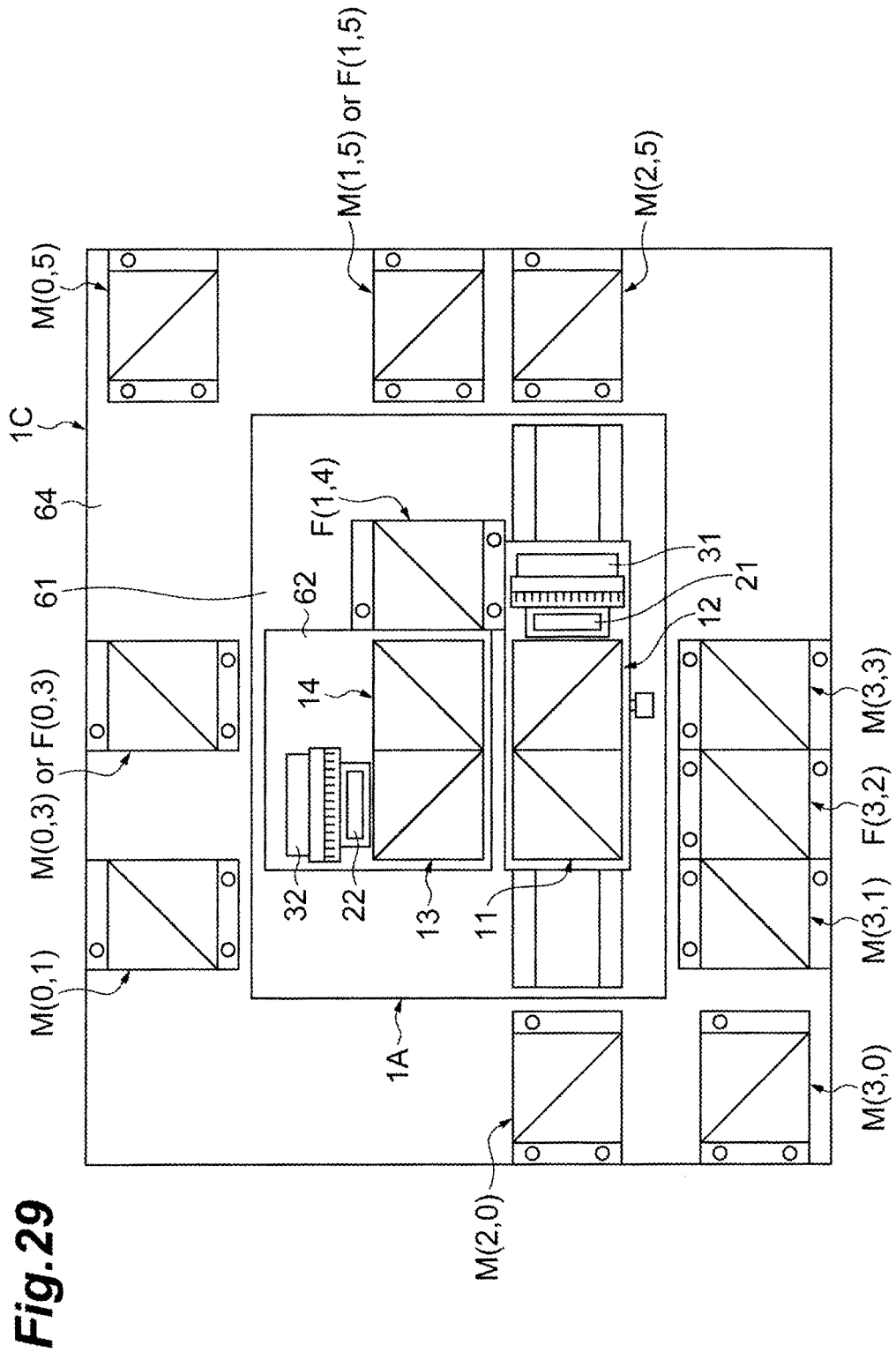
FIG. 29 is a plan view illustrating an example of a configuration for specifically realizing the extension structures illustrated in FIGS. 26A to 28B.

FIG. 29 is a plan view illustrating an example of a configuration for specifically realizing the extension structures illustrated in FIGS. 26A to 28B. As illustrated in FIG. 29, an extension structure 1C includes the optical module 1A illustrated in FIGS. 10 to 14, a mirror holder 64 having a flat plate shape, a plurality of total reflection mirrors M(0, 1), M(0, 3), M(0, 5), M(1, 5), M(2, 0), M(2, 5), M(3, 0), M(3, 1), and M(3, 3), and a plurality of wavelength selecting filters F(0, 3), F(1, 4), F(1, 5), and F(3, 2). The optical module 1A, the total reflection mirrors, the wavelength selecting filters are all mounted on the mirror holder 64.

Figure 30A:
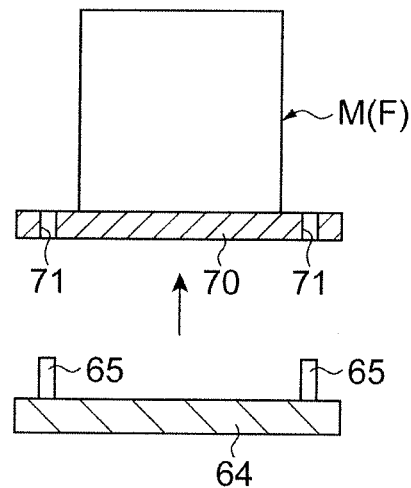
FIG. 30A is a cross-sectional side view illustrating a positioning structure when a total reflection mirror and a wavelength selecting filter are mounted on a mirror holder.
Figure 30B:
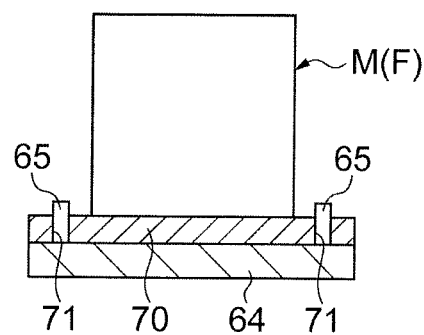
FIG. 30B is a cross-sectional side view illustrating a positioning structure when a total reflection mirror and a wavelength selecting filter are mounted on a mirror holder.

Here, FIGS. 30A and 30B are cross-sectional side view illustrating a positioning structure when a total reflection mirror M and a wavelength selecting filter F are mounted on the mirror holder 64. The total reflection mirror M and the wavelength selecting mirror F are mounted on a support plate 70 which is a rectangle-shaped flat plate as illustrated in FIG. 30A. The area of the support plate 70 is larger than the bottom area of the total reflection mirror M and the wavelength selecting filter F, and a plurality of holes 71 are formed in a part of the support plate 70 which is located around the total reflection mirror M and the wavelength selecting filter F. On the other hand, the mirror holder 64 is provided with a plurality of positioning pins 65 corresponding to the holes 71. As illustrated in FIG. 30B, the total reflection mirror M and the wavelength selecting filter F are detachably attached onto the mirror holder 64 and are positioned by inserting the positioning pins 65 into the plurality of holes 71.

The mirrors M(0, 1), M(0, 5), M(2, 5), and M(3, 0) illustrated in FIG. 29 do not interfere with traveling of the beams L1 and L2 even when the mirrors are not used in the extension structures illustrated in FIGS. 26A to 28B, and thus may be fixed onto the mirror holder 64. The number of holes 71 in one support plate 70 may be, for example, an odd number (three in an example). Accordingly, it is possible to prevent the total reflection mirror M and the wavelength selecting filter F from being mounted on the mirror holder 64 in incorrect directions.

FIGS. 31 to 35 are plan views illustrating extension structures 1D to 1H in which the total reflection mirror M and the wavelength selecting filter F are arranged on the mirror holder 64 to correspond to the modes illustrated in FIGS. 26A to 28A. In the extension structures 1D to 1H, the total reflection mirror M and the wavelength selecting filter F which interfere with the optical paths of the beams L1 and L2 in the extension structure 1C illustrated in FIG. 29 are removed.

Figure 31:
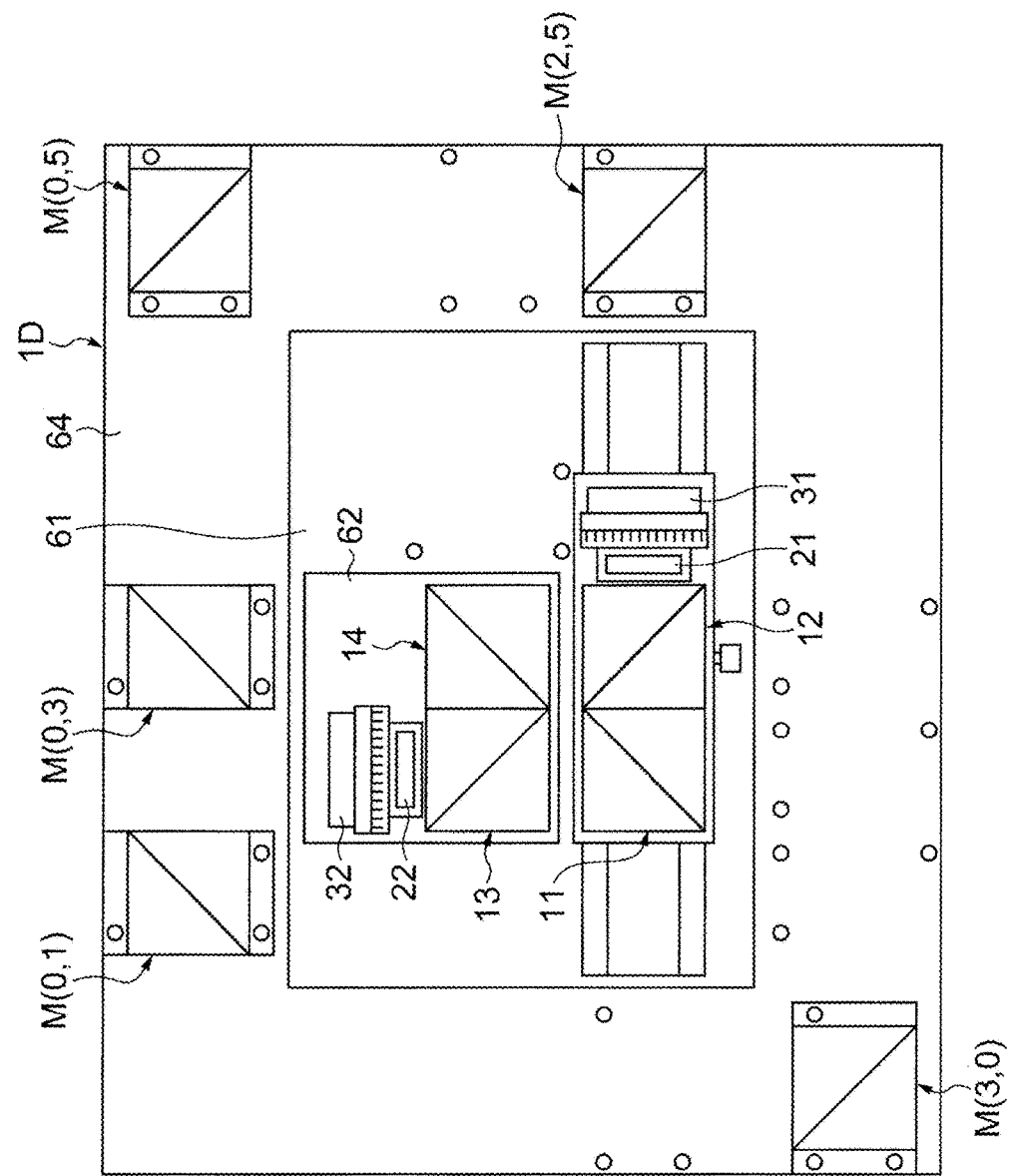
FIG. 31 is a plan view illustrating an extension structure.
Figure 32:
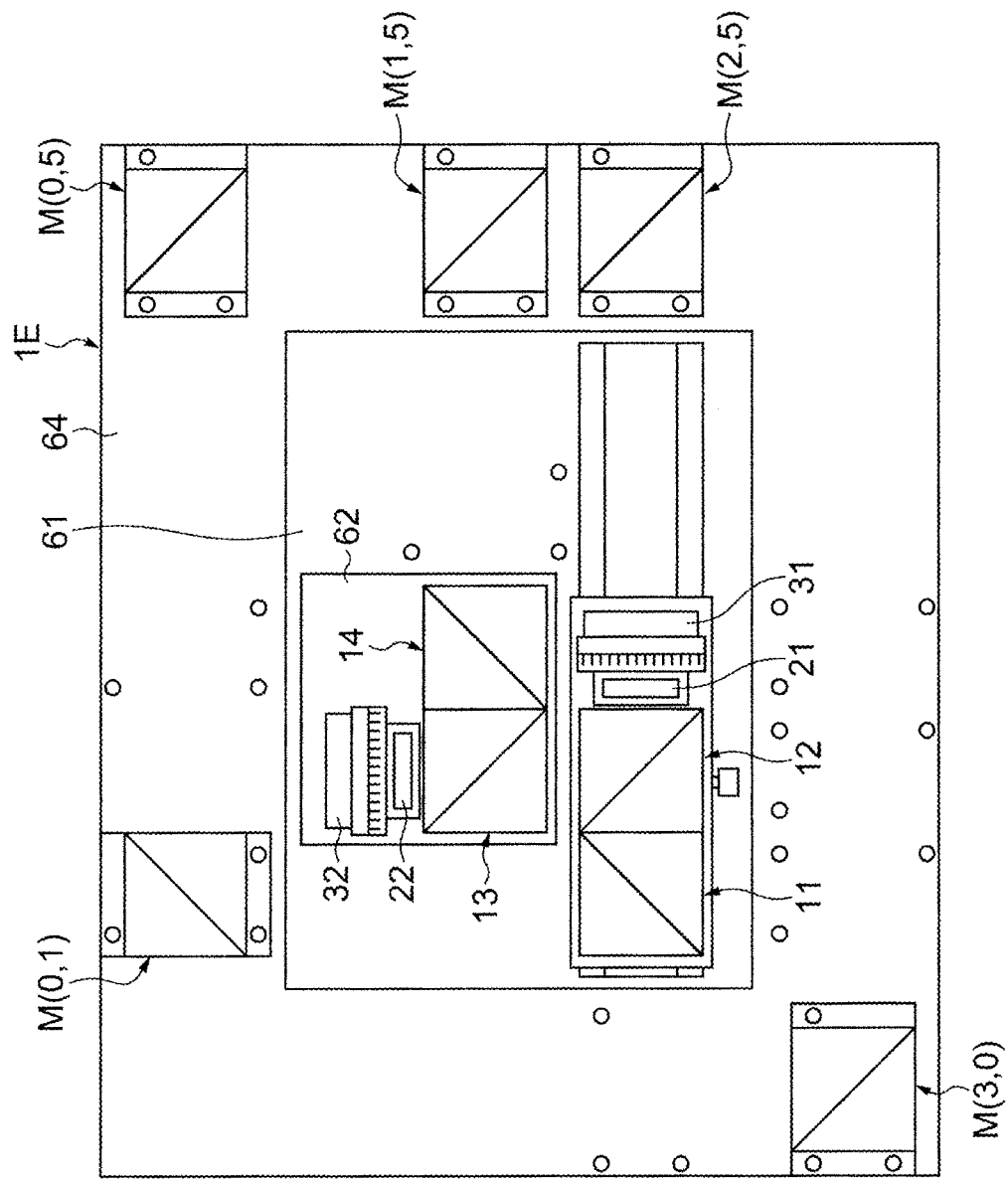
FIG. 32 is a plan view illustrating an extension structure.
Figure 33:
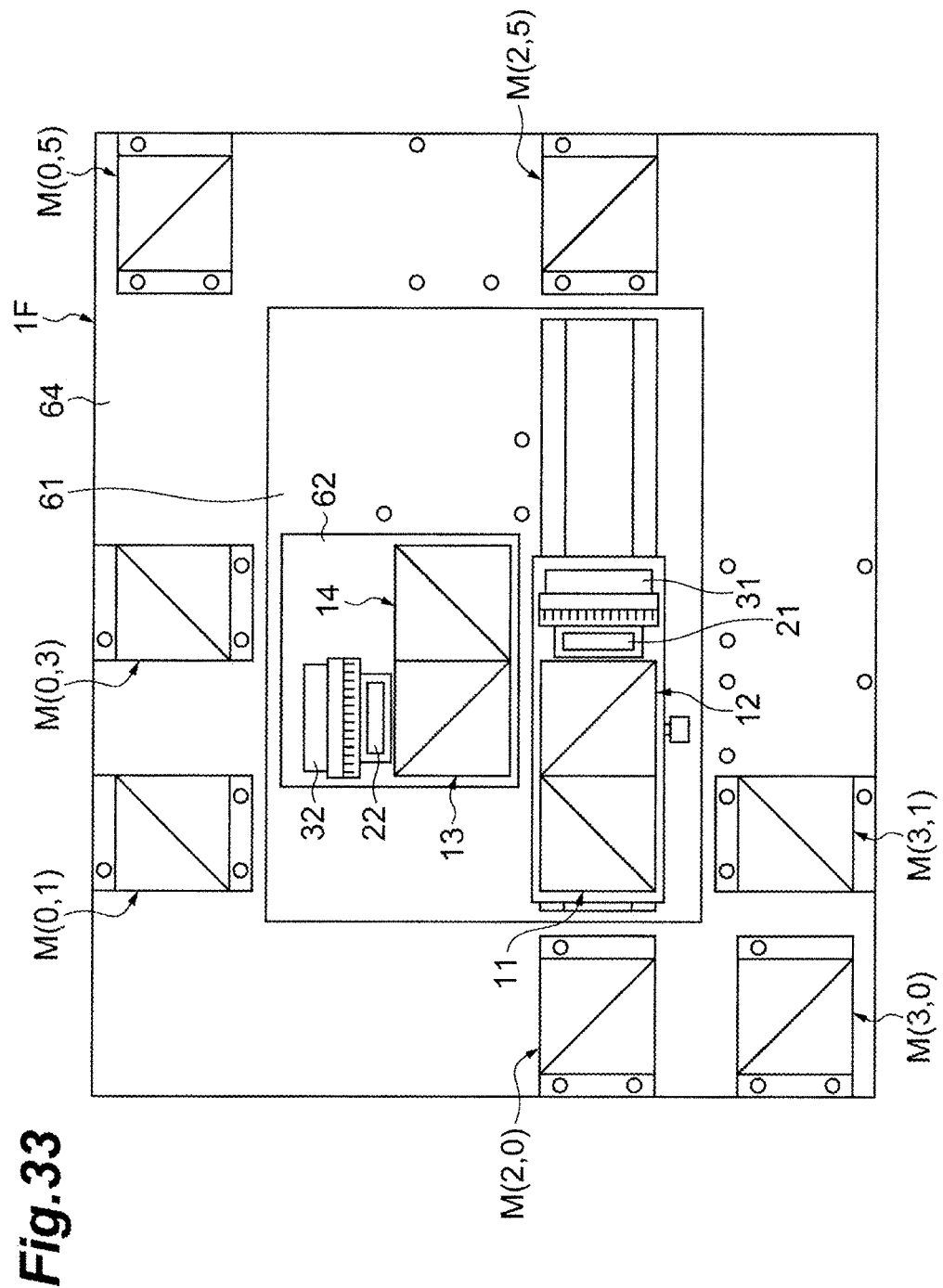
FIG. 33 is a plan view illustrating an extension structure.
Figure 34:
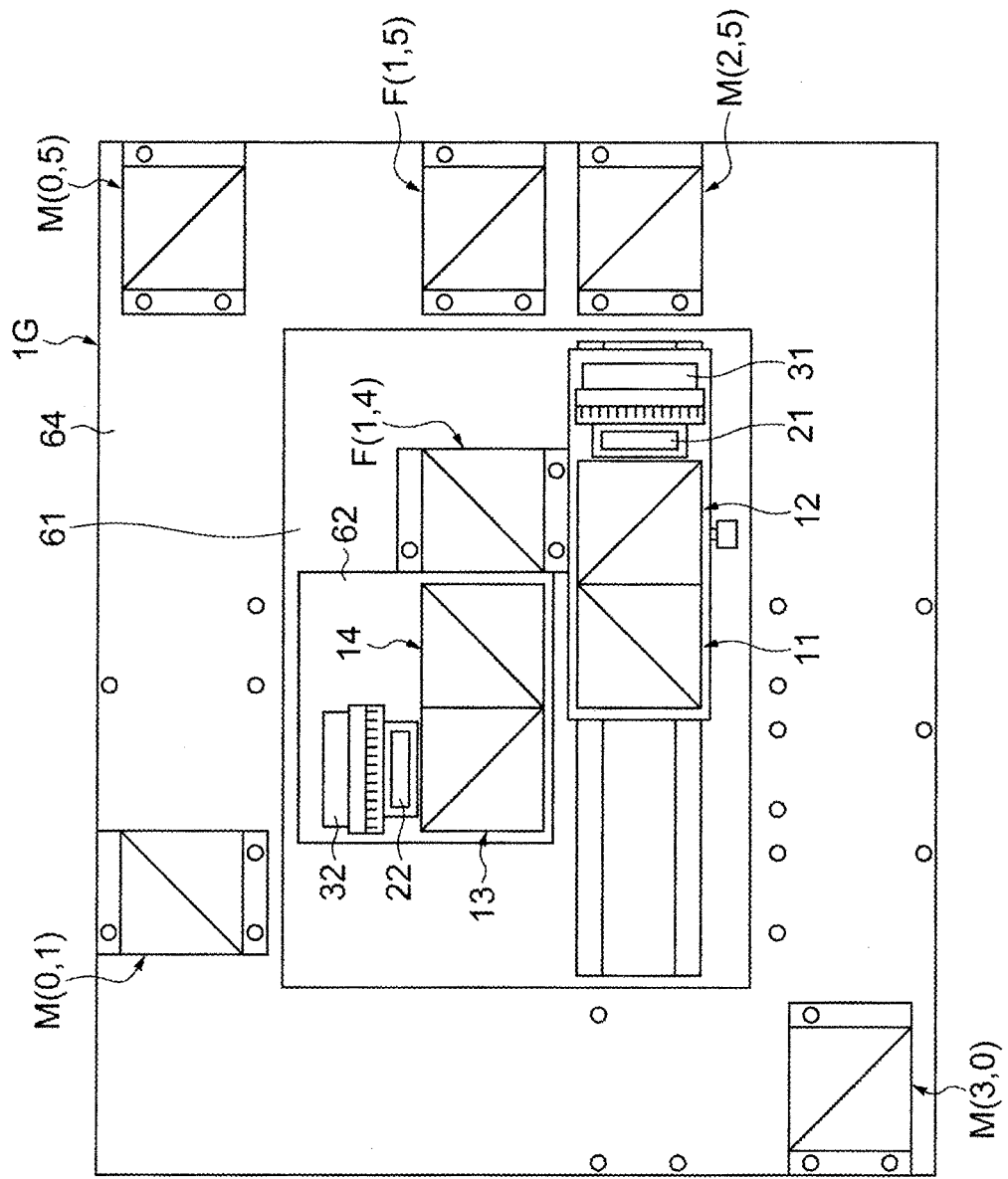
FIG. 34 is a plan view illustrating an extension structure.
Figure 35:
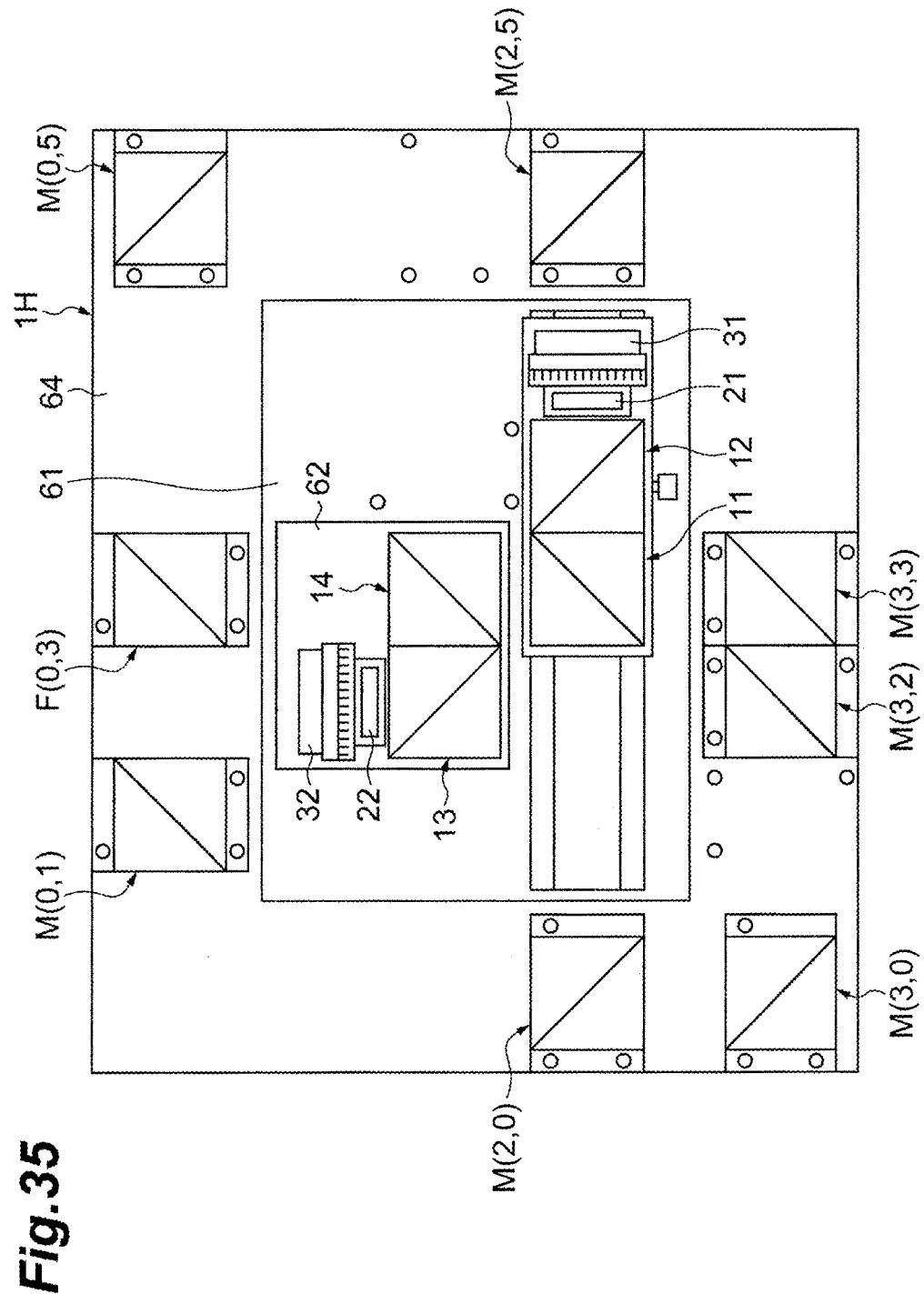
FIG. 35 is a plan view illustrating an extension structure.

Specifically, the extension structure 1D illustrated in FIG. 31 corresponds to the mode md(1, 1) illustrated in FIG. 26B, and the mirror M(0, 3) in addition to the normally fixed mirrors is attached to the mirror holder 64. The extension structure 1E illustrated in FIG. 32 corresponds to the mode md(2, 0) illustrated in FIG. 27A, and the mirror M(1, 5) in addition to the normally fixed mirrors is attached to the mirror holder 64. The extension structure 1F illustrated in FIG. 33 corresponds to the mode md(0, 2) illustrated in FIG. 27B, and the mirrors M(0, 3), M(0, 2), and M(3, 1) in addition to the normally fixed mirrors are attached to the mirror holder 64. The extension structure 1G illustrated in FIG. 34 corresponds to the mode md(1, 0) illustrated in FIG. 28A, and the wavelength selecting filters F(1, 4) and F(1, 5) in addition to the normally fixed mirrors are attached to the mirror holder 64. The extension structure 1H illustrated in FIG. 35 corresponds to the mode md(0, 1) illustrated in FIG. 28B, and the wavelength selecting filter F(0, 3) and the mirrors M(2, 0), M(3, 2), and M(3, 3) in addition to the normally fixed mirrors are attached to the mirror holder 64.

According to the above-mentioned extension structures according to the embodiments, beams L1 and L2 can be made to be coaxial at the time of incidence and exit of the beams L1 and L2 in all the modulation modes and the optical module 1A can be more easily treated.

What is claimed is:
1. An optical module for modulating and outputting input light, the optical module comprising:
   first and second optical elements sequentially arranged in a positive direction of a first vector;
   third and fourth optical elements located in a positive direction of a second vector intersecting the first vector relative to the first and second optical elements and sequentially arranged in the positive direction of the first vector;

a first polarization control element and a first reflective light modulator sequentially arranged in one of the positive direction of the first vector and a negative direction of the second vector from the second optical element;

a second polarization control element and a second reflective light modulator sequentially arranged in one of a negative direction of the first vector and the positive direction of the second vector from the third optical element; and a sliding mechanism configured to relatively move the first and second optical elements and the third and fourth optical elements in the direction of the first vector, wherein the first optical element has a first wavelength selection surface that transmits a first beam and reflects a second beam having a wavelength other than that of the first beam, the first wavelength selection surface being disposed at an angle at which the second beam incident in the positive direction of one of the first vector and the second vector is reflected in the positive direction of the other of the first vector and the second vector, the second optical element is configured to output at least a part of a beam incident in the positive direction of the first vector to the first polarization control element and output at least a part of a beam returned from the first reflective light modulator via the first polarization control element in the positive direction of the second vector, the third optical element is configured to output at least a part of a beam incident in the positive direction of the second vector to the second polarization control element and output at least a part of a beam returned from the second reflective light modulator via the second polarization control element in the positive direction of the first vector, and the fourth optical element has a second wavelength selection surface that reflects one of the first beam and the second beam and transmits the other of the first beam and the second beam, the second wavelength selection surface being disposed at an angle at which the one beam incident in the positive direction of one of the first vector and the second vector is reflected in the positive direction of the other of the first vector and the second vector, wherein the sliding mechanism moves the first, second, third and fourth optical elements so as to select one optical coupling state from among a first, second, and third mode, wherein the first mode is am ode in which the third optical element is located in the positive direction of the second vector relative to the first optical element, and the fourth optical element is located in the positive direction of the second vector relative to the second optical element, wherein the second mode is a mode in which the third optical element is located in the positive direction of the second vector relative to the second optical element, and wherein the third mode of a mode in which the fourth optical element is located in the positive direction of the second vector relative to the first optical element.

2. The optical module according to claim 1, wherein at least one of the first and second wavelength selection surfaces comprise a wavelength selecting filter or a dichroic mirror.

3. The optical module according to claim 1, wherein at least one of the second and third optical elements comprise a polarization beam splitter or a half mirror.

4. The optical module according to claim 1, further comprising at e st one of:
a first shading portion disposed in the other direction of the positive direction of the first vector and the negative direction of the second vector relative to the second optical element; and
a second shading portion disposed in the other direction of the negative direction of the first vector and the positive direction of the second vector relative to the third optical element.

5. The optical module according to claim 1, wherein at least one of the first and second polarization control elements comprise one of a polarizing plate, a wavelength plate, a Faraday rotator, and a variable polarization rotator.

6. The optical module according to claim 1, wherein at least one of the first and second polarization control elements is detachable.

7. The optical module according to claim 1, further comprising a mechanism configured to allow at least one of the first and second polarization control elements to rotate about an optical axis.

8. The optical module according to claim 1, wherein at least one of the first and second reflective light modulator comprises a spatial light modulator or an electro-optic modulator.

9. The optical module according to claim 1, further comprising a mechanism configured to allow at least one of the first and second reflective light modulators to rotate about an optical axis.

* * * * *